(12) United States Patent
Schlueter et al.

(10) Patent No.: US 12,089,788 B1
(45) Date of Patent: Sep. 17, 2024

(54) DISPENSER FOR MEAL PRODUCTION SYSTEM

(71) Applicant: Spyce Food Co., Somerville, MA (US)

(72) Inventors: Luke Schlueter, Somerville, MA (US); Nicholas S. Ambrogi, Charlestown, MA (US); Huicheng Wang, Newton, MA (US); Michael Farid, Cambridge, MA (US)

(73) Assignee: Spyce Food Co., Somerville, MA (US)

( * ) Notice: Subject to any disclaimer, the term of this patent is extended or adjusted under 35 U.S.C. 154(b) by 370 days.

(21) Appl. No.: 17/491,148

(22) Filed: Sep. 30, 2021

Related U.S. Application Data

(63) Continuation of application No. 17/077,104, filed on Oct. 22, 2020, now abandoned.

(51) Int. Cl.
| | |
|---|---|
| *A47J 47/01* | (2006.01) |
| *A47J 27/04* | (2006.01) |
| *A47J 27/16* | (2006.01) |
| *B65G 47/18* | (2006.01) |

(52) U.S. Cl.
CPC ............ *A47J 47/01* (2013.01); *A47J 27/04* (2013.01); *A47J 27/16* (2013.01); *B65G 47/18* (2013.01); *A47J 2027/043* (2013.01)

(58) Field of Classification Search
CPC .. A47J 47/01; A47J 27/04; A47J 27/16; A47J 2027/043; B65G 47/18; G01F 11/00; G01F 11/003; G01F 11/28; G01F 11/282; G01F 11/36; G01F 11/40; G01F 11/38; A47G 19/34; B05C 5/001; B05C 11/1042; B05C 17/00523; B05C 17/00546; B67D 3/0022; B67D 7/80; Y10T 137/6606

See application file for complete search history.

(56) References Cited

U.S. PATENT DOCUMENTS

| | | | |
|---|---|---|---|
| 3,213,587 A | 10/1965 | Carruthers | |
| 3,322,306 A * | 5/1967 | Munderich | ............. G01F 13/00 |
| | | | 222/440 |

(Continued)

FOREIGN PATENT DOCUMENTS

| | | |
|---|---|---|
| CN | 108341096 A | 7/2018 |
| CN | 209631066 U | 11/2019 |

(Continued)

OTHER PUBLICATIONS

*U.S. Appl. No. 17/490,452, filed Sep. 30, 2021, Hernandez et. al.

(Continued)

*Primary Examiner* — Donnell A Long
(74) *Attorney, Agent, or Firm* — Wolf, Greenfield & Sacks, P.C.

(57) ABSTRACT

A meal ingredient dispenser may include a housing having an internal volume. The meal ingredient dispenser may include a first gate and a second gate configured to move between an open position and a closed position. In the closed position, the first gate and second gate may define a portion volume therebetween. The meal ingredient dispenser may include a wiper positioned on an interior wall of the housing in the portion volume and an actuator coupled to the wiper and configured to move the wiper blade inside of the portion volume.

23 Claims, 14 Drawing Sheets

(56) References Cited

U.S. PATENT DOCUMENTS

| | | | |
|---|---|---|---|
| 3,411,765 A * | 11/1968 | Schmidt | C21B 5/003 |
| | | | 266/183 |
| 3,859,904 A | 1/1975 | Carriazo | |
| 4,685,387 A | 8/1987 | Hanson et al. | |
| 4,905,525 A * | 3/1990 | Kurfurst | B01L 3/0289 |
| | | | 73/864.01 |
| 4,944,218 A | 7/1990 | Cresson | |
| 5,113,753 A | 5/1992 | Robinson | |
| 5,132,914 A | 7/1992 | Cahlander et al. | |
| 5,562,183 A | 10/1996 | Naramura | |
| 5,964,381 A | 10/1999 | El-Hage et al. | |
| 6,269,850 B1 | 8/2001 | Price et al. | |
| 6,619,339 B2 | 9/2003 | Price et al. | |
| 6,662,969 B2 | 12/2003 | Peeler et al. | |
| 8,272,535 B2 * | 9/2012 | Huang | B29C 45/76 |
| | | | 222/52 |
| 9,532,575 B1 | 1/2017 | Donisi et al. | |
| 10,143,228 B2 | 12/2018 | Vardakostas et al. | |
| 10,219,535 B2 | 3/2019 | Vardakostas et al. | |
| 10,455,987 B1 | 10/2019 | He | |
| 10,492,358 B1 * | 12/2019 | Wilson | B65B 57/20 |
| 2009/0056562 A1 | 3/2009 | Julian et al. | |
| 2012/0294108 A1 | 11/2012 | Dickson, Jr. et al. | |
| 2014/0299227 A1 | 10/2014 | Dix | |
| 2018/0310773 A1 | 11/2018 | Sekar et al. | |
| 2019/0059645 A1 | 2/2019 | Nelson et al. | |
| 2019/0104883 A1 | 4/2019 | Nelson | |
| 2019/0133372 A1 | 5/2019 | Lehman et al. | |

FOREIGN PATENT DOCUMENTS

| | | |
|---|---|---|
| EP | 0 296 496 A2 | 12/1988 |
| EP | 1 415 919 A1 | 5/2004 |
| GB | 1 452 620 A | 10/1976 |

OTHER PUBLICATIONS

*U.S. Appl. No. 17/490,605, filed Sep. 30, 2021, Gwozdz et. al.
*U.S. Appl. No. 17/490,741, filed Sep. 30, 2021, Gwozdz et. al.

* cited by examiner

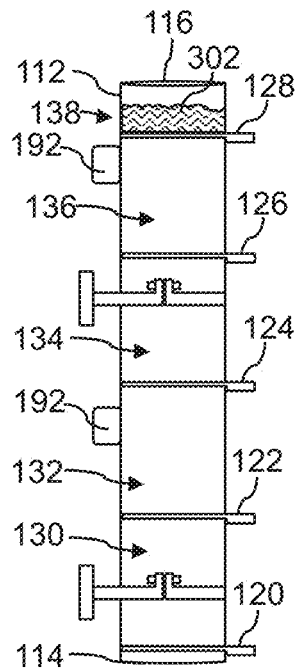 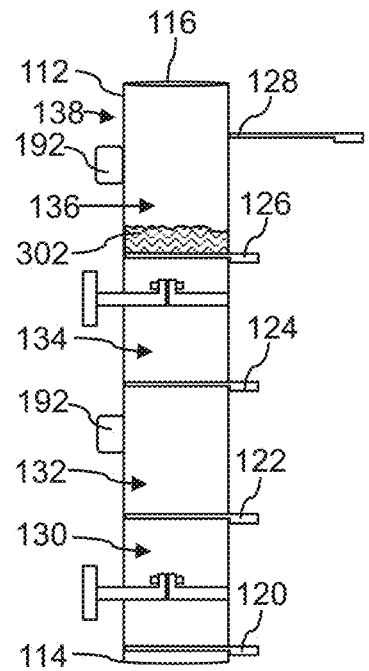 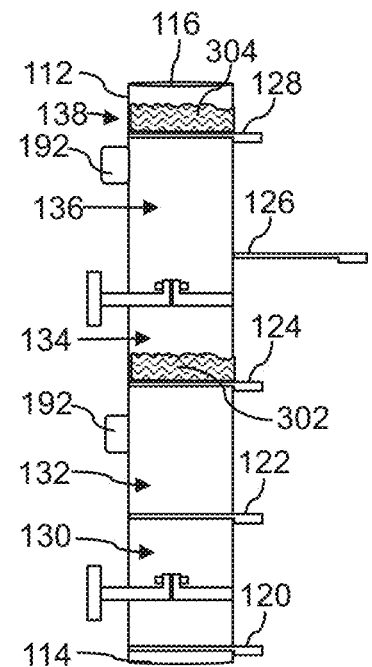
FIG. 11A  FIG. 11B  FIG. 11C
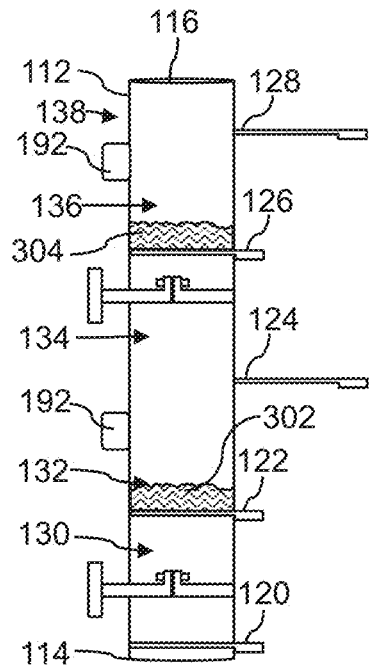 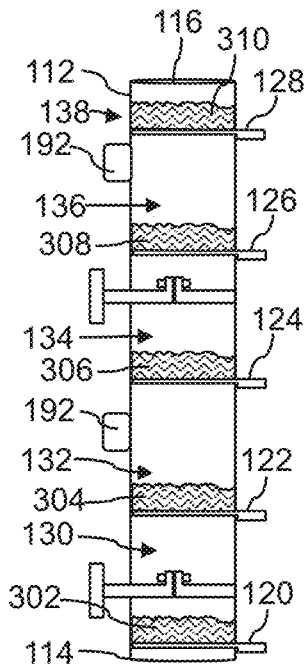
FIG. 11D  FIG. 11E

DISPENSER FOR MEAL PRODUCTION SYSTEM

RELATED APPLICATIONS

This Application is a continuation of U.S. application Ser. No. 17/077,104, filed Oct. 22, 2020, the disclosure of which is incorporated herein by reference in its entirety.

FIELD

Disclosed embodiments are related to a dispenser for a meal production system and related methods of use.

BACKGROUND

Food handling and cooking has been traditionally performed by humans. In some cases, robotic systems have attempted to emulate aspects of human cooking, but such systems have been slower than human cooks or have other drawbacks.

SUMMARY

In some embodiments, a meal ingredient dispenser for a meal production system includes a housing including an internal volume configured to contain at least one portion of a meal ingredient, the housing including an outlet through which the meal ingredient is dispensed, and the housing having an axis aligned with a direction in which the meal ingredient is dispensed. The meal ingredient dispenser also includes a wiper positioned on an interior wall of the housing, where the wiper is configured to move parallel to the axis between a first wiper position and a second wiper position, and where the wiper does not obstruct a central portion of the internal volume. The meal ingredient dispenser also includes an actuator coupled to the wiper and configured to move the wiper between the first wiper position and the second wiper position.

In some embodiments, a meal ingredient dispenser for a meal production system includes a housing including an internal volume configured to contain at least one portion of a meal ingredient, the housing including an outlet through which the meal ingredient is dispensed, and the housing having an axis aligned with a direction in which the meal ingredient is dispensed. The meal ingredient dispenser also includes a first gate positioned adjacent the outlet, where the first gate is configured to move between a first open position and a second closed position, a second gate positioned in the internal volume, where the second gate is configured to move between a first open position and a second closed position, and where the first gate and the second gate define a portion volume therebetween when both the first gate and the second gate are in the closed positions. The meal ingredient dispenser also includes a wiper positioned on at least a portion of an interior wall of the housing in the portion volume, and an actuator coupled to the wiper and configured to move the wiper inside of the portion volume.

In some embodiments, a meal ingredient dispenser for a meal production system includes a housing including an internal volume configured to contain at least one portion of a meal ingredient, the housing including an outlet through which the meal ingredient may pass out of the internal volume, and a portion container configured to receive a portion of the meal ingredient in a portion volume, where the portion container includes an upper opening and a lower opening, where the portion container is configured to move between a receiving position in which the upper opening is accessible to the outlet and a dispensing position in which the lower opening is open to dispense the portion, and where the portion container moves transverse to an axis of the housing between the receiving position and the dispensing position. The meal ingredient dispenser also includes a wiper positioned adjacent to and outside of the housing, where the wiper is configured to move between a first proximal position and a second distal position, and where in the distal position a portion of the wiper extends into the portion volume through the upper opening. The meal ingredient dispenser also includes an actuator coupled to the wiper and configured to move the wiper between the first proximal position and the second distal position.

In some embodiments, a method of operating a meal ingredient dispenser of a meal production system includes moving a first gate adjacent to an outlet of a meal ingredient dispenser housing from a first closed position to a second open position, moving a second gate positioned inside of an internal volume of the housing from a second open position to a first closed position, where the first gate and the second gate define a portion volume therebetween when both the first gate and the second gate are in the closed positions, and moving a wiper from a first wiper position to a second wiper position to dislodge a first meal ingredient portion positioned in the portion volume.

In some embodiments, a meal ingredient dispenser for a meal production system includes a removable housing including an internal volume, an inlet, and an outlet, where the inlet is configured to receive meal ingredient portions into the internal volume, a first gate adjacent the outlet, where the first gate is configured to move between a first open position and a second closed position, and a second gate positioned in the internal volume, w % here the second gate is configured to move between a first open position and a second closed position, where the first gate and the second gate define a first portion volume therebetween when both the first gate and the second gate are in the closed positions and where the first portion is configured to contain a meal ingredient portion. The meal ingredient dispenser also includes a heating element configured to heat the first portion volume.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings:

FIG. 11A is a side schematic of the meal ingredient dispenser of FIG. 10 in a first state:

FIG. 11B is a side schematic of the meal ingredient dispenser of FIG. 10 in a second state:

FIG. 11C is a side schematic of the meal ingredient dispenser of FIG. 10 in a third state;

FIG. 11D is a side schematic of the meal ingredient dispenser of FIG. 10 in a fourth state;

FIG. 11E is a side schematic of the meal ingredient dispenser of FIG. 10 in a fifth state;

DETAILED DESCRIPTION

Figure 1:
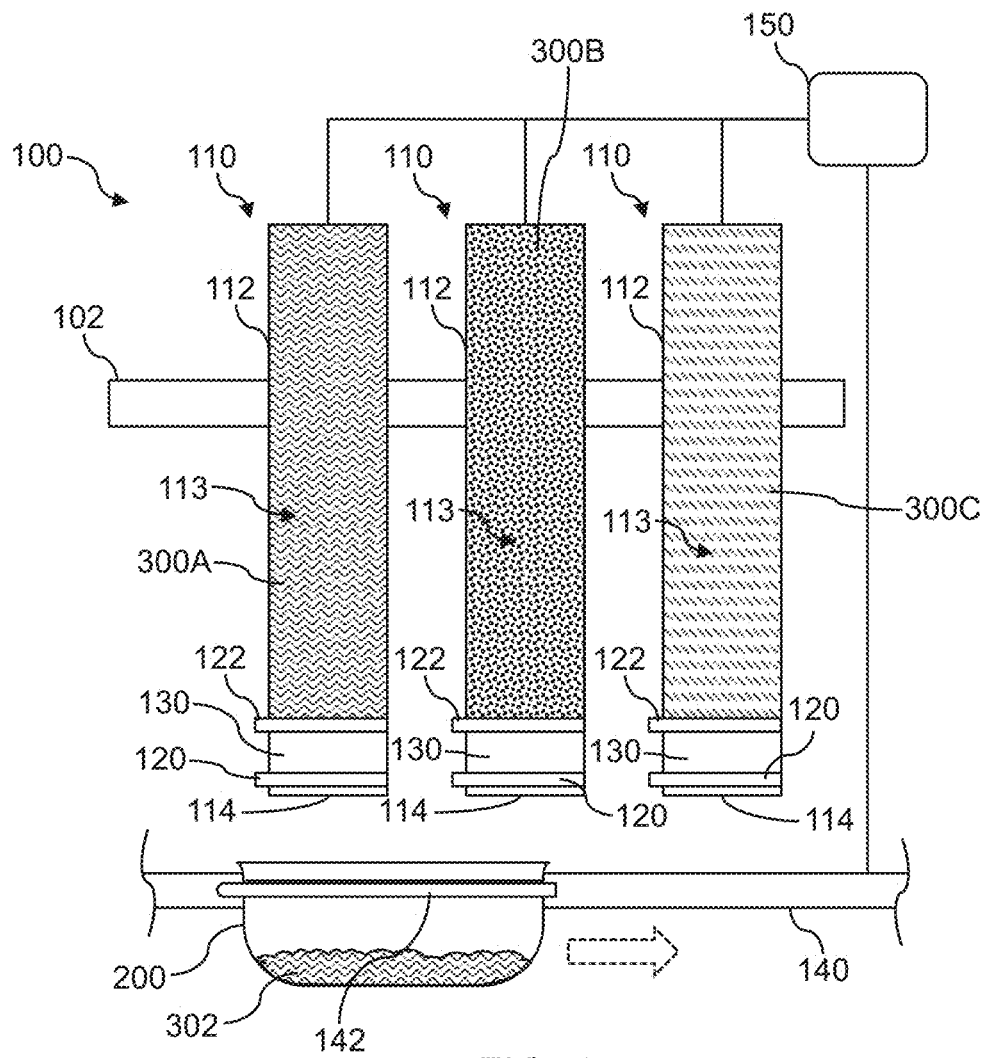
FIG. 1 is a side schematic of one embodiment of a meal production system including a plurality of meal ingredient dispensers.

Take out or fast food from quick service restaurants is a staple of many diets around the world. Quick service restaurants may spend a significant percentage of their revenue on labor costs. These operating costs may prevent restaurants from being able to sell fast, convenient meals at affordable prices or have a negative impact on operating margins. A significant portion of employee time in food service may involve preparing meal ingredients (e.g., food) in bulk to be assembled into a completed meal. Additionally, employee time may be spent heating various meal ingredients and ensuring meal ingredients stay at safe temperatures.

In view of the above, the inventors have recognized the benefits of an automated meal production system that enables automatic preparation of meal orders, including custom meal orders. In particular, the inventors have recognized the benefits of a meal ingredient dispenser that allows a portion of a meal ingredient to be dispensed onto a meal receptacle with accuracy and repeatability. The meal ingredient dispenser may include one or more gates that are configured to separate a predetermined portion of a meal ingredient from a bulk volume of that meal ingredient. The meal ingredient dispenser may accordingly dispense the separated portion of a meal ingredient onto a meal receptacle. The control of the gates may enable a specific volume of a meal ingredient to be reliably separated from a bulk volume of the meal ingredient so that a consistently sized portion of the meal ingredient may be dispensed into successive meal receptacles. Accordingly, the meal ingredient dispenser may reduce the amount of interaction between a meal ingredient and a human employee, as well as allow custom meals to be produced in a consistent automated manner.

In some embodiments, a meal ingredient dispenser includes a housing having an inlet and an outlet. The housing may include an internal volume configured to contain at least one portion of a meal ingredient. For example, in some embodiments, the internal volume may include a plurality of portions of a meal ingredient, such that the internal volume is able to supply servings of the meal ingredient to a plurality of meal receptacles. The inlet of the housing may be configured to receive the meal ingredient. In some embodiments, a human employee may place the meal ingredient into the meal ingredient dispenser through the inlet. The outlet is configured to selectively dispense a single portion of the meal ingredient onto a meal receptacle. Accordingly, in some embodiments, the outlet is configured to be aligned with the meal receptacle as the meal ingredient portion is dispensed through the outlet.

In some embodiments, the meal ingredient dispenser may also include a first gate located adjacent (e.g., at or proximate) the outlet, and a second gate positioned between the first gate and the inlet. The first gate and second gate may each be configured to move between a closed position where the first and second gate divide the internal volume of the housing, and an open position where the internal volume is continuous. That is, the first gate and second gate may be configured to move into the internal volume and out of the internal volume of the housing. When the first gate and second gate are in their respective closed positions, the first gate and second gate may define a portion volume therebetween. The first gate and second gate may be controlled to selectively separate a portion of a meal ingredient from a bulk mass of the meal ingredient inside of the internal volume. For example, in some embodiments, the second gate may be moved to the open position while the first gate remains in the closed position to allow the meal ingredient to fall into the portion volume. The second gate may then move to the closed position to separate a portion of the meal ingredient from the remaining volume of meal ingredient in the internal volume. Once separated, the first gate may move to the open position to allow the meal ingredient portion to be dispensed from the outlet. In some embodiments, the housing may have a longitudinal axis that is aligned with a vertical direction (i.e., a direction of local gravity). In such an embodiment, the meal ingredient inside of the internal volume may be biased in a direction from the inlet toward the outlet by the weight of the meal ingredient under the effect of gravity.

In some embodiments, a meal production system includes a track having one or more meal receptacle holders. The track is configured to move the one or more meal receptacle holders along the track. A meal receptacle may be placed on a meal receptacle holder so that the meal receptacle may be moved along the track. According to exemplary embodiments described herein, the meal production system may also include at least one meal ingredient dispenser positioned above the track and configured to dispense a meal ingredient onto a meal receptacle positioned below the at least one meal ingredient dispenser. In this manner, one or more portions of various meal ingredients may be dispensed onto a meal receptacle to form a finished meal.

According to exemplary embodiments described herein, one or more meal ingredient dispensers may be employed to dispense meal ingredients onto a meal receptacle. The meal ingredient dispensers may be configured to dispense solids, semi-solids, or liquid meal ingredients. Additionally, the meal ingredient dispensers may be configured to dispense hot ingredients, cold ingredients, or room temperature ingredients. A meal ingredient dispenser may dispense raw ingredients and/or prepared ingredients. For example, a meal ingredient dispenser may dispense proteins, vegetables, grains, fruit, toppings, that are in raw form or pre-prepared and cooked. The meal ingredient dispensers according to exemplary embodiments described herein may be configured to dispense a predetermined volume or weight of a meal ingredient, depending at least partly on a custom order from a user. That is, a user may select a meal ingredient and an amount of the meal ingredient based on a recipe or custom input. For example, a user may request a meal containing three meal ingredients, where each meal ingredient is configured to be dispensed from a corresponding meal ingredient dispenser in a chosen or predetermined volume.

In addition to the above, the inventors have recognized the benefits of a meal ingredient dispenser that facilitates movement of a meal ingredient inside of the meal ingredient dispenser. In some cases, certain meal ingredients may adhere to walls of a housing of a meal ingredient or otherwise stick to various elements of the meal ingredient dispenser. For example, semi-solid ingredients such as vegetables or fruits with high water content may adhere to the walls of a housing. As another example, light ingredients such as leafy vegetables (e.g., lettuce, spinach, etc.) may be more susceptible to catching onto various protruding elements of a meal ingredient dispenser such that they resist moving under the influence of gravity toward an outlet of the meal ingredient dispenser. Accordingly, the inventors have recognized the benefits of a wiper configured to dislodge a meal ingredient from a wall of an internal volume and/or portion volume to facilitate the movement of the meal ingredient towards an outlet of the meal ingredient dispenser. In particular, the inventors have recognized the benefits of a wiper that does not block or otherwise obstruct a central portion of an internal volume of the meal ingredient dispenser. In this manner, the wiper may provide a continuous passageway for a meal ingredient to move toward an outlet of the meal ingredient dispenser by the weight of the meal ingredient under the effect of gravity.

In some embodiments, a meal ingredient dispenser includes a housing having an internal volume configured to contain at least one portion of a meal ingredient. The housing may also include an outlet through which the meal ingredient is dispensed. The housing may include a longitudinal axis that is aligned with a direction in which the meal ingredient is dispensed via the outlet. The longitudinal axis may be aligned with a vertical direction (i.e., a direction of local gravity) so that the meal ingredient is biased toward the outlet of the housing. The meal ingredient dispenser may include a first gate positioned adjacent (e.g., at or proximate) the outlet and a second gate position in the internal volume. Each of the first gate and second gate may be configured to move between open positions where the internal volume is continuous and closed positions where the gates divide the internal volume. When the first gate and second gate are in the closed position, they may define a portion volume therebetween. The portion volume may be sized and shaped to receive a predetermined volume of a meal ingredient contained in the meal ingredient dispenser. The meal ingredient dispenser may also include a wiper positioned on an interior wall of the housing in the portion volume. That is, the wiper may be positioned between the first gate and the second gate. The wiper may be configured to move to dislodge meal ingredients disposed on the interior wall. In some embodiments, the wiper may rotate in a circumferential direction along the interior wall of the meal ingredient dispenser. In other embodiments, the wiper may move linearly along the interior wall in a direction parallel to the longitudinal axis of the housing. For example, the wiper may move between a proximal position and a distal position relative to the outlet of the housing. The meal ingredient dispenser may include an actuator coupled to the wiper and configured to move the wiper inside of the portion volume. In some embodiments, the wiper may not obstruct a central portion of the internal volume, such that there is a continuous passageway in the internal volume of the housing through which the meal ingredient can move toward the outlet when the first gate and second gate are in the open positions.

According to exemplary embodiments described herein, a meal ingredient dispenser may also include a wiper positioned between two gates. However, a wiper may be located in any suitable portion of an internal volume of a housing, as the present disclosure is not so limited. That is, the position of the wiper is not constrained to a portion volume of a meal ingredient dispenser, and a wiper may be positioned on any suitable internal wall of a housing to facilitate movement of meal ingredients inside of the housing. Additionally, while certain embodiments of meal ingredient dispensers described herein include a single wiper, in other embodiments multiple wipers may be employed. For example, each portion volume of a meal ingredient dispenser may include an associated wiper, where there are two or more portion volumes in the meal ingredient dispenser. Accordingly, the number of wipers employed in a meal ingredient dispenser is not so limited in this regard.

In some embodiments, a meal ingredient dispenser includes a housing having an internal volume configured to contain at least one portion of a meal ingredient. The housing may also include an outlet through which the meal ingredient is dispensed. The housing may include a longitudinal axis that is aligned with a direction in which the meal ingredient is dispensed via the outlet. The longitudinal axis may be aligned with a vertical direction (i.e., a direction of local gravity) so that the meal ingredient is biased toward the outlet of the housing. In some embodiments, the housing may be configured as a tube, such that the internal volume is cylindrical. The meal ingredient dispenser may also include a wiper positioned on an interior wall of the housing, where the wiper is configured to move along the interior wall in a direction parallel to the longitudinal axis of the housing between a first wiper position and a second wiper position. That is, according to this embodiment, the wiper is configured to move between a proximal position and a distal position relative to the outlet of the housing. The movement of the wiper may be configured to dislodge a meal ingredient from the internal wall of the housing.

In some embodiments, a wiper of a meal ingredient dispenser may include a taper in a direction toward an internal wall of a housing of the meal ingredient dispenser, such that the wiper is configured to lift a meal ingredient away from the wall (e.g., in a direction inward of the wiper). The taper may be formed as an incline plane that is angled with respect to the internal wall of the housing. Accordingly, when the wiper moves a narrowest portion (measured in a direction perpendicular to the internal wall) of the wiper may form a leading edge of the wiper to engage the meal ingredient and lift the meal ingredient away from the internal wall. A wiper may have any suitable arrangement, as the present disclosure is not so limited.

In some embodiments, a wiper of a meal ingredient dispenser may not obstruct a central portion of an internal volume of a housing in which the wiper is disposed. Accordingly, a continuous passageway may extend through the housing such that the meal ingredient may pass through freely when any gates of the meal ingredient dispenser are open. In some embodiments, the wiper is shaped as an annulus that may be circular, ellipsoidal, rectangular, or square to match the shape of one or more internal walls of the housing. A wiper may take any suitable shape to match the shape of one or more internal walls of the housing, as the present disclosure is not so limited. In some embodiments, the wiper may have no associated structural supports positioned inward of the wiper relative to the internal volume. For example, if the internal volume has a cylindrical shape, the wiper may have no associated supports positioned radially inward of the wiper. Instead, any supports may be located radially outward of the wiper. Similarly, supports for a wiper may be positioned outward relative to a central portion of the internal volume for any shape of housing. In this manner, the wiper may keep a central portion of the internal volume clear and free from obstructions so that a meal ingredient may move freely toward an outlet of the meal ingredient dispenser.

According to exemplary embodiments described herein, one or more gates of a meal ingredient dispenser and a wiper of the meal ingredient dispenser may be operated concurrently. That is, in some embodiments, a wiper may be moved between a first wiper position and a second wiper position at the same time one or more gates are moved between a closed position and an open position. For example, in some embodiments a wiper may be moved between a first wiper position and a second wiper position when a gate positioned below the wiper is moved from a closed position to an open position. According to this embodiment, the wiper may be moved to dislodge any meal ingredients as the gate opens to allow the meal ingredient to fall past the gate. In some embodiments, a wiper and a gate may be mechanically coupled to one another such that a single actuator may actuate both the wiper and the gate at the same time.

In some embodiments, a meal ingredient dispenser may include a vibratory actuator configured to vibrate at least one portion of a housing of the meal ingredient dispenser. In some cases, meal ingredient stiction may be reduced by inducing acceleration in the meal ingredient and/or housing with vibration. The vibratory actuator may include an eccentric mass coupled to a motor or a piezoelectric element configured to induce vibrations in the housing and/or meal ingredient. In some embodiments, the vibratory actuator may be activated when one or more gates of the meal ingredient dispenser are in an open position to assist with freeing a meal ingredient from stiction with one or more internal walls of the housing. In some embodiments, the vibratory actuator may be activated when one or more gates of the meal ingredient dispenser are in a closed position to assist with settling a meal ingredient against one or more of the closed gates. The vibratory actuator may be actuated at any suitable time, as the present disclosure is not so limited.

According to exemplary embodiments described herein, a portion volume of a meal ingredient dispenser may be sized and shaped to receive a predetermined volume of a meal ingredient. In some embodiments, the portion volume may match the predetermined volume of the meal ingredient. That is, the dimensions of the portion volume may match the dimensions of a meal ingredient portion to be dispensed. In other embodiments, a portion volume may be different than a predetermined volume of a meal ingredient portion. In particular, the portion volume may be greater than the predetermined volume of a meal ingredient portion. For example, in some embodiments a maximum transverse dimension of the portion volume is greater than a maximum transverse dimension of the meal ingredient portion. In such an embodiment, there may be a discontinuous transition between the internal volume above the portion volume and the portion volume itself. The internal volume above the portion volume may have a maximum transverse dimension equivalent to that of the meal ingredient portion, while the portion volume has a larger maximum transverse dimension. Accordingly, when the meal ingredient portion is received in the portion volume the meal ingredient portion may not contact or may have reduced contact with any internal walls of the portion volume. Accordingly, the meal ingredient portion inside of the portion volume may experience less stiction as a result of the different maximum transverse dimensions of the portion volume and meal ingredient portion. A portion volume and meal ingredient portion may have any suitable dimensions, as the present disclosure is not so limited.

In some embodiments, it may be desirable to move a portion volume relative to an internal volume of a housing of a meal ingredient dispenser to ensure separation between a meal ingredient portion contained in the portion volume and the remainder of a meal ingredient in the internal volume. Additionally, by moving a portion volume away from an internal volume, a wiper may physically force an entire meal ingredient portion out of the portion volume without interfering with the internal volume. Accordingly, in some embodiments a meal ingredient dispenser includes a housing having an internal volume and an outlet through which a meal ingredient may pass out of the internal volume. The meal ingredient dispenser may include a portion container configured to receive a portion of the meal ingredient in a portion volume. The portion container may include an upper opening and a lower opening and may be configured to move between a receiving position and a dispensing position. In the receiving position, the upper opening may be aligned with the outlet of the housing to receive a meal ingredient portion. In the dispensing position, the portion container may be moved in a direction transverse (e.g., perpendicular) to a longitudinal axis of the housing so that the upper opening and the lower opening are exposed. The meal ingredient dispenser may include a wiper configured to move through the upper opening to the lower opening when the portion container is in the dispensing position to force a meal ingredient portion contained within the portion volume out of the lower opening. The wiper may be moved between a proximal position and a distal position to force the meal ingredient portion out of the lower opening. The wiper may be coupled to an actuator such as a linear actuator configured to move the wiper.

In addition to the above, the inventors have also recognized the benefits of preparing freshly heated (e.g., cooked) meal ingredients in advance of a meal order, or at least preparing a heated meal ingredient for rapid dispensing onto a meal receptacle once a meal order is placed. In particular, the inventors have recognized the benefits of a meal ingredient dispenser that functions as a buffer between a cooking element (e.g., a plancha, wok, grill, steamer, oven, or any other suitable cooking element) and a track carrying one or more meal receptacles configured to receive heated meal ingredients. That is, the meal ingredient dispenser may be configured to receive heated meal ingredient portions from the cooking element and temporarily store the heated meal ingredient. The meal ingredient dispenser may maintain the heated meal ingredient portion at a serving temperature, such that when a meal receptacle arrives to receive a meal ingredient the meal ingredient dispenser may dispense the meal ingredient portion to the meal receptacle. Accordingly, when an order is received a meal receptacle need not dwell or otherwise wait for a heated meal ingredient portion to be prepared, as a recently prepared meal ingredient may be held in a meal ingredient dispenser associated with the cooking element. In some embodiments, the meal ingredient dispenser may include multiple portion volumes so that multiple heated meal ingredient portions may be buffered from a single cooking element.

In some embodiments, a meal ingredient dispenser includes a housing including an internal volume, an inlet, and an outlet. The inlet is configured to receive meal ingredient portion from an external source into the internal volume of the meal ingredient dispenser. In some embodiments, the inlet may be aligned with an outlet of a cooking element, such that the inlet receives heated meal ingredient portions from the cooking element. The meal ingredient dispenser may also include a first gate adjacent the outlet, where the first gate is configured to move between a first open position and second closed position. The meal ingredient dispenser may also include a second gate positioned in the internal volume between the first gate and the inlet, where the second gate is also configured to move between a first open position and a second closed position. When the first gate and second gate are in the closed positions, they may divide the internal volume into multiple portion volumes. In particular, a first portion volume may be between the first gate and second gate, and a second portion volume may be between the second gate and the inlet. The meal ingredient dispenser may also include a heating element configured to maintain the internal volume at a predetermined temperature. In some embodiments the meal ingredient dispenser may include third and fourth gates which further divide the internal volume of the meal ingredient dispenser housing. In particular, the additional gates may divide the internal volume into a third portion volume and fourth portion volume in addition to the first portion volume and second portion volume. Accordingly, in this embodiment, the meal ingredient dispenser may store up to four separate heated meal ingredient portions for later dispensing to a meal receptacle.

According to exemplary embodiments described herein, a meal ingredient dispenser may include one or more heating elements configured to maintain an internal volume of the meal ingredient dispenser (e.g., a meal ingredient containing internal volume) at a predetermined temperature. In some embodiments, a heating element may be configured as a resistive heater configured to heat a housing of the meal ingredient dispenser. In some embodiments, a heating element may be configured as a steam source fluidly coupled to the internal volume, where steam from the steam source maintains the temperature of the internal volume at the predetermined temperature. In some embodiments, the predetermined temperature may be a temperature for safe temporary food storage. For example, in some embodiments the predetermined temperature may be between 135 and 200° F. In other embodiments, the predetermined temperature may be any desired temperature for meal ingredient portions. In some embodiments, a heating element may be configured as a cooking element where the predetermined temperature may be between 200 and 212° F. In one such embodiment, the heating element may be a steam source configured to provide steam to one or more portion volumes of the meal ingredient dispenser and steam a contained meal ingredient portion. According to this embodiment, the meal ingredient dispenser may receive an unheated meal ingredient portion, and the heating element may heat the meal ingredient portion once inside the internal volume. A meal ingredient dispenser may include any suitable heating element in any suitable number providing conductive, radiative, or convective heat transfer to one or more meal ingredient portions, as the present disclosure is not so limited.

In some embodiments, a meal ingredient dispenser may include a first portion volume configured to have a first predetermined temperature and a second portion volume configured to have a second predetermined temperature different from the first predetermined temperature. According to this embodiment, the meal ingredient dispenser may include one or more heating elements configured to raise the temperature of the first portion volume and second portion volume to the respective temperature. In some embodiments, the first predetermined temperature may be higher than the second predetermined temperature. For example, the first predetermined temperature may be a cooking temperature (e.g., for searing, steaming, etc.) whereas the second predetermined temperature may be a food safe temporary storage temperature. In one such embodiment, the first predetermined temperature may be a steaming temperature of 212° F., and the second predetermined temperature may be between 135 and 200° F. In some embodiments, a single heating element may be configured to heat the first portion volume to the first predetermined temperature and the second portion volume to the second predetermined temperature. For example, in some embodiments the heating element may be configured to heat the first portion to the first predetermined temperature, and residual heat from the first portion volume may transfer to the second portion volume such that the second portion volume reaches the second predetermined temperature. In some embodiments, a steam source may be coupled to the first portion volume and configured to provide steam into the first portion volume. Residual heat from the steam in the first portion volume may be employed to heat the second portion volume to the second predetermined temperature. In some embodiments, additional portion volumes may be heated in this manner with residual heat from a heating element, as the present disclosure is not so limited.

It should be noted that while some embodiments described herein are configured to temporarily store pre-prepared heated meal ingredients, in other embodiments a meal ingredient dispenser may be configured to receive a meal ingredient heated to order. In some cases, depending on the length of a track of a meal production system, a specific order, and/or a queue of meal receptacles awaiting meal ingredients, a meal receptacle may not reach a position associated with a meal ingredient dispenser for a predetermined interval of time. Accordingly, a meal production system may be configured to heat a meal ingredient portion and provide that meal ingredient portion to the meal ingredient dispenser within the interval of time. In some embodiments, a meal receptacle may not start down a track of a meal production system until a heated meal ingredient portion is in a meal ingredient dispenser, or is projected to be ready in the meal ingredient dispenser by the time the meal receptacle arrives at the meal ingredient dispenser. In this manner, the meal production system may provide heated meal ingredient portions that are not prepared prior to a user submitting an order to the meal production system. In other embodiments, a meal production system may pre-prepare heated meal ingredient portions based on projected and/or historical demand. For example, during a lunch hour it may be projected that demand may be high for one or more heated meal ingredient portions. Accordingly, a meal production system may prepare for a rush by heating multiple heated meal ingredient portions and storing those heated meal ingredient portions temporarily in the meal ingredient dispenser. Any suitable arrangement for producing heated meal ingredient portions and delivering those portions to a meal receptacle may be employed, as the present disclosure is not so limited.

It should also be noted that while some embodiments of a meal ingredient dispenser are discussed with reference to heated, cooled, or room temperature meal ingredients, any suitable temperature for a meal ingredient may be employed, as the present disclosure is not so limited. In some embodiments, a heating element may be replaced with a refrigeration element (e.g., a heat pump, thermoelectric device, etc.) configured to lower a temperature of an internal volume of a meal ingredient dispenser to a predetermined temperature. In some embodiments, rather than individual heating elements or refrigeration elements, one or more meal ingredient dispenser may be disposed in a heated or refrigerated compartment. Accordingly, any suitable temperature maintain arrangement for a meal ingredient dispenser may be employed, as the present disclosure is not so limited.

In some embodiments, a meal ingredient dispenser may include a removable housing. That is, a housing of a meal ingredient dispenser including an internal volume configured to contain a meal ingredient may be configured to be removable from other components of the meal ingredient dispenser. Such removability may allow for simplified cleaning compared to a non-removable housing. For example, in some embodiments, gates of a meal ingredient dispenser may not be coupled to the housing and may simply enter the housing through a slot. Accordingly, the gates may be withdrawn from the housing so that the housing may be removed without interference from the gates. Likewise, in some embodiments a wiper of the meal ingredient dispenser may not be coupled to the housing, so that the housing may be removed without interference from the wiper. In some embodiments, a housing may be slidable relative to the wiper so that the housing may be removed in at least one direction without interference from the wiper. In some embodiments, the housing may be connected to a superstructure of a meal production system with one or more quick release fasteners so that the housing may be easily removed from the superstructure. The removability may allow a user (e.g., an employee) to remove a housing for regular cleaning processes or other services.

While some embodiments of meal ingredient dispensers described herein allow meal ingredients to move toward an outlet of a meal ingredient dispenser by the weight of the meal ingredient under the effect of gravity, other arrangements are contemplated. In some embodiments, a meal ingredient dispenser may include a biasing member configured to bias a meal ingredient toward an outlet of the meal ingredient dispenser. For example, in some embodiments a meal ingredient dispenser may include a spring configured to urge the meal ingredient toward the outlet. In another example, ballast may be employed at the top of a meal ingredient to add additional weight urging the meal ingredient toward the outlet under the effect of gravity. Any suitable biasing member may be employed to bias a meal ingredient toward an outlet, as the present disclosure is not so limited.

In some embodiments, a meal production system according to exemplary embodiments described herein may be configured to receive an order from one or more users, and subsequently the meal production system may prepare the ordered meal. A meal production system may receive an input from one or more users at one or more input devices. Representative input devices may be tablets, point-of-sale devices, mobile devices (e.g., smartphones), personal computers (e.g., desktops, laptops, etc.), or any other suitable input device. The one or more input devices may be located near the meal production system (e.g., in the same building or room), or may be remotely located. The one or more input devices may communicate wirelessly or wired with a machine controller of the meal production system that may control one or more components of the meal production system. At the one or more input devices a user may be able to select one or more meal ingredients to form a meal. In some embodiments, the user may select independent meal ingredients and custom quantities of those ingredients. In some embodiments, the user may select from a plurality of predetermined recipes which specify meal ingredients in predetermined quantities. In some embodiments, the user may select from a plurality of predetermined recipes, and further customize those recipes by increasing quantity of ingredients (e.g., selecting extra protein) or selecting add-ons (e.g., toppings, sides, etc.). While in some embodiments a user may be customer, in other embodiments the user may be an employee (e.g., chef, cashier, waiter, etc.) or any other suitable user, as the present disclosure is not so limited. In some embodiments, a first user (e.g., a customer) may submit an order, and a second user (e.g., an employee) may edit the order.

According to exemplary embodiments described herein, a meal production system may be operated by a machine controller. The machine controller may include one or more processors configured to execute computer readable instructions stored in volatile or non-volatile memory. The machine controller may communicate with one or more actuators associated with various elements of the meal production system (e.g., track, meal ingredient dispensers, gates, wipers, etc.) to control movement of the various elements. The machine controller may receive information from one or more sensors that provide feedback regarding the various elements of the meal production system. For example, the machine controller may receive position information regarding a meal receptacle holder. In this manner, the machine controller may implement proportional control, integral control, derivative control, or a combination thereof (e.g., PID control). Other feedback control schemes are also contemplated, and the present disclosure is not limited in this regard. Any suitable sensors in any desirable quantities may be employed to provide feedback information to the machine controller. Accelerometers, rotary encoders, potentiometers, optical sensors, and cameras may be employed in coordination with desirable processing techniques (e.g., machine vision). The machine controller may also communicate with other machine controllers, computers, or processors on a local area network, wide area network, or internet using an appropriate wireless or wired communication protocol. In some embodiments, a machine controller may execute computer readable instructions based at least in part on input from a user. For example, a machine controller may receive a recipe or custom order including a series of actions to be executed by the meal production system. The machine controller may execute the instructions based at least partly on the recipe or custom order to prepare a meal.

According to exemplary embodiments described herein, various elements of a meal production system may be movable with one or more actuators. That is, various elements may include one or more actuators that provide one or more corresponding degrees of freedom. Actuators that control elements such as meal dispensers and meal receptacle holders may include any suitable electromechanical, pneumatic, or hydraulic actuator. For example, actuators for use with exemplary embodiments described herein may include stepper motors with lead screws, linear actuators, rigid chain actuators, pneumatic linear actuators, hydraulic linear actuators, and others. As noted previously, actuators of exemplary embodiments described herein may be connected or otherwise controlled by a machine controller.

According to exemplary embodiments described herein, a meal production system may be configured to assemble a meal in a meal receptacle. That is, the meal production system of exemplary embodiments herein may be configured to dispense one or more meal ingredients onto a meal receptacle. In some embodiments, a meal receptacle may be configured as a bowl. In other embodiments, a meal receptacle may be configured as a plate. In some embodiments, a meal receptacle may be configured as a tray including one or more food receiving regions. Any suitable meal receptacle having any suitable shape may be employed with a meal production system according to exemplary embodiments described herein, as the present disclosure is not so limited.

As used herein, "dispensing" refers to depositing a solid, semi-solid, or liquid meal ingredient in a meal receptacle. "Dispensing" may also be referred to as "dropping" or "placing", in some embodiments.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1 is a side schematic of one embodiment of a meal production system 100 including a plurality of meal ingredient dispensers 110. As shown in FIG. 1, the meal production system includes a superstructure 102 configured to support each of the meal ingredient dispensers 110 as well as a track 140. According to the embodiment of FIG. 1, each of the meal ingredient dispensers includes a housing 112 including an internal volume 113 configured to contain a meal ingredient. In particular, the three meal ingredient dispensers include a first meal ingredient 300A, a second meal ingredient 300B, and a third meal ingredient 300C, respectively. Each of the housings 112 includes an outlet 114 through which the meal ingredient is configured to be dispensed. The meal ingredient dispensers also include first gates 120 positioned adjacent to the outlets 114, and second gates 122 positioned in the internal volume 113 above the first gates 120. That is, the first gates 120 are positioned between the second gates 122 and the outlets 114. Each pair of the first gates and second gates defines a portion volume 130 therebetween. The portion volume is sized and shaped to receive a predetermined volume of the meal ingredient to form a meal ingredient portion that may be dispensed onto a meal receptacle 200. According to the embodiment of FIG. 1, the first gates 120 and second gates 122 may be configured to move between open positions where the meal ingredients are free to move toward the outlets 114, and closed positions where the gates block movement of the meal ingredient towards the outlets. That is, the first gates and second gates may be configured to selectively divide the internal volume 113 of each meal ingredient dispenser 110. The functionality of meal ingredient dispensers 110 similar to those of FIG. 1 will be discussed further with reference to other exemplary embodiments described herein.

As shown in FIG. 1, the meal production system includes a track 140 which support one or more meal receptacle holders 142 on the track. The meal receptacle holders are configured to support a meal receptacle 200 and move the meal receptacle along the track 140 in the direction shown by the dashed arrow. In some embodiments, the meal receptacle holder 142 may be controlled independently of any other meal receptacle holder positioned on the track. In such an embodiment, the track 140 may be configured as a magnetic conveyor. Meal receptacles holders 142 may move in sync with other meal receptacle holders in other embodiments, as the present disclosure is not so limited. As shown in FIG. 1, the meal receptacle holder 142 is configured to support a meal receptacle 200 which is configured as a bowl. As the meal receptacle holder moves the meal receptacle along the track 140, the meal receptacle may be configured to receive one or more meal ingredient portions from the meal ingredient dispensers 110. For example, as shown in FIG. 1, the meal receptacle has received a first meal ingredient portion 302. According to the embodiment of FIG. 1, when the meal receptacle 200 is in a position aligned with one or more of the meal ingredient dispensers 110, the first gates of the one or more meal ingredient dispensers may be opened to dispense a meal ingredient portion through the outlet 114 and onto the meal receptacle. In some embodiments, the meal receptacle holder 142 may stop or slow the meal receptacle 200 at a position associated with one or more of the meal ingredient dispensers to allow a meal ingredient portion to be dispensed onto the meal receptacle.

According to the embodiment of FIG. 1, the meal production system 100 is controlled by a machine controller 150, which may include one or more processors configured to execute computer readable instructions stored in volatile or non-volatile memory. As shown in FIG. 1, the machine controller is connected to each of the meal ingredient dispensers 110. The machine controller may coordinate the dispensing of meal ingredients from each of the dispensers. For example, the machine controller may command one of the meal ingredient dispensers to move the first gate from the closed position to the open position to dispense a meal ingredient from the first meal ingredient dispenser. The machine controller 150 is also connected to the track 140 and is configured to control the position, velocity, and acceleration of one or more meal receptacle holders 142. The machine controller may coordinate the motion of multiple meal receptacles to avoid collisions between the meal receptacles and/or meal receptacle holders. In some embodiments, the machine controller may coordinate motion of the meal receptacle holder 142 based at least partly on an order received from a user, who may input the order at one or more user input devices.

Figure 2A:
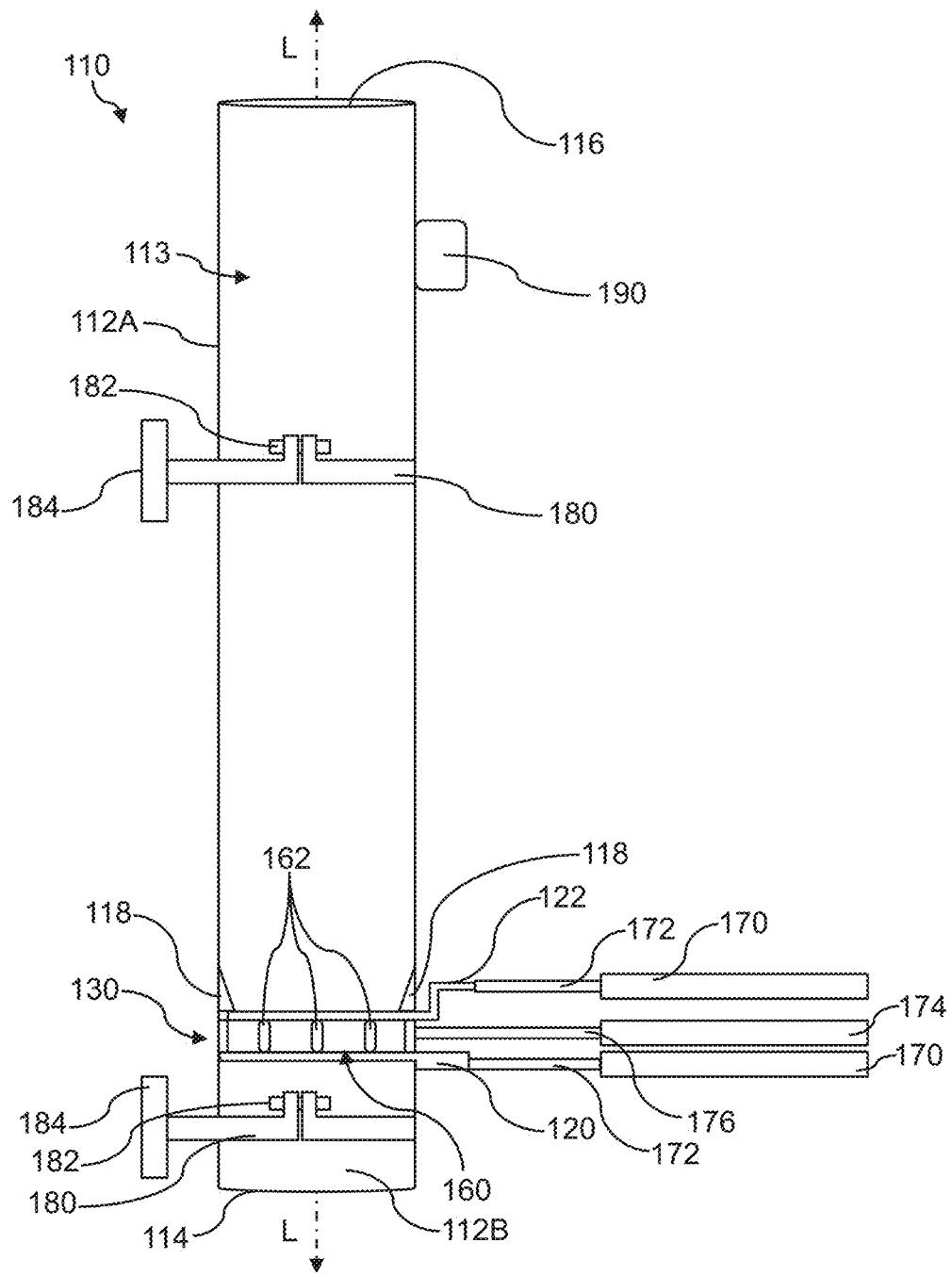
FIG. 2A is side schematic of one embodiment of a meal ingredient dispenser.

FIG. 2A is side schematic of one embodiment of a meal ingredient dispenser 110. As shown in FIG. 2A, the meal ingredient dispenser includes a housing formed by a first housing portion 112A and a second housing portion 112B. The housing includes an internal volume 113 configured to contain a meal ingredient. In the particular embodiment of FIG. 2A, the housing has a cylindrical shape, and the internal volume 113 correspondingly has a cylindrical shape. The housing also includes an outlet 114 through which the meal ingredient may be dispensed to a meal receptacle. The housing further includes an inlet 116 configured to receive the meal ingredient dispenser. That is, the inlet may be used to fill the internal volume 113 with a meal ingredient. While in the embodiment of FIG. 2A the inlet 116 is shown open, in other embodiments the inlet may include a removable lid, septum, or other suitable arrangement to selectively seal close the inlet 116. According to the embodiment of FIG. 2A, the inlet 116 and outlet 114 are positioned at opposite ends of the housing. The inlet 116 and outlet 114 are aligned with a longitudinal axis L of the housing. In the embodiment of FIG. 2A, the longitudinal axis may be aligned with a vertical direction (i.e., a direction of local gravity). Accordingly, a meal ingredient portion inside of the internal volume 113 may be biased toward the outlet 114 under its own weight under the effect of gravity. Put alternatively, the meal ingredient may be configured to fall towards the outlet 114.

As shown in FIG. 2A, the first housing portion 112A and second housing portion 112B are supported by supports 180 that allow the first housing portion and second housing portion to be removed from a meal production system. In the embodiment of FIG. 2A, the supports wrap around an external surface of the housing and clamp to the housing. Quick release fasteners 182 may be used to secure the supports to the housing. The quick release fasteners may be loosened to allow the housing portions to slide relative to the supports, such that the housing portions may be removed from the supports entirely. In other embodiments, any suitable fastener may be employed, including, but not limited to, pins, bolts, and screws, as the present disclosure is not so limited. The support may also be coupled to a flange 184 which may be employed to mount the meal ingredient dispenser on a superstructure of a meal production system. Any suitable arrangement for support may be employed, as the present disclosure is not so limited.

As shown in FIG. 2A, the meal ingredient dispenser includes a first gate 120 and a second gate 122. The first gate 120 is located adjacent (e.g., at or proximate) the outlet 114 relative to the second gate 122. The second gate is positioned in the internal volume 113 between the first gate 120 and the inlet 116. The first gate 120 and second gate 122 are configured to move between a closed position as shown in FIG. 2A, and an open position. In the closed position, the first gate and second gate block the internal volume 113. That is, the first gate and second gate divide the internal volume 113 into multiple separate volumes. When the first gate and second gate are in the closed position, they define a portion volume 130 therebetween. The portion volume may be sized and shaped to receive a predetermined volume of a meal ingredient inside of the internal volume 113. When the first gate and second gate are in the open position, the internal volume may no longer be divided and a meal ingredient may move (e.g., under the effect of gravity) toward the outlet 114. According to the embodiment of FIG. 2A, the first gate 120 and second gate 122 may move into and out of the internal volume 113 via a slot formed in the housing. In particular, the first gate may extend through a slot formed in the second housing portion 112B and the second gate may extend through a slot formed in the first housing portion 112A when each of the gates are in their respective closed positions. As shown in FIG. 2A, the first gate and second gate may be coupled to gate actuators 170. The gate actuator may include an output shaft 172 or another suitable linkage configured to move the gates linearly between the open position and closed positions. Accordingly, the gate actuators may be linear actuators 170. In other embodiments, the actuators may be rotary actuators, where the first gate and second gate are configured to rotate between the open position and closed position. In other embodiments, any suitable actuator may be employed to move a gate of a meal ingredient dispenser, as the present disclosure is not so limited. As shown in FIG. 2A, each of the first gate 120 and second gate 122 may be associated with an independent actuator, so that the first gate and second gate may be moved independently relative to one another.

As shown in FIG. 2A, the meal ingredient dispenser includes a wiper 160 positioned between the first gate 120 and the second gate 122. That is, the wiper is positioned inside of the portion volume 130. The wiper of FIG. 2A is configured to move along an internal wall of the portion volume to dislodge any meal ingredient portions that are contained in the portion volume, so that the meal ingredient portions may fall freely to toward the outlet 114 when the first gate 120 is in the open position. In particular, as shown in FIG. 2A, the wiper 160 includes a plurality of wiper blades 162 which extend in a direction parallel to the longitudinal axis L. The wiper 160 is configured to rotate about the longitudinal axis L so that each of the wiper blades 162 moves circumferentially around the internal wall of the housing. That is, the wiper blades 162 may orbit the longitudinal axis L as they move around the portion volume 130 to dislodge any meal ingredient portion inside of the portion volume. In some embodiments, the wiper blades 162 may move continuously in a single direction along the internal wall of the portion volume. According to the embodiment shown in FIG. 2A, the first housing portion 112A and second housing portion 112B may be separate portions. That is, the first housing portion 112A and second housing portion 112B may not be connected to one another or formed as an integral piece. The wiper 160 may function as a coupling between the first housing portion 112A and second housing portion 112B so that the internal volume 113 remains continuous between the inlet 116 and the outlet 114. That is, in some embodiments the wiper 160 may at least partially receive the first housing portion 112A and the second housing portion 112B. In other embodiments, the first housing portion 112A and second housing portion 112B may at least partially receive the wiper, as the present disclosure is not so limited.

According to the embodiment of FIG. 2A, the wiper 160 is coupled to a wiper actuator 174 which is configured to rotate the wiper 160. As shown in FIG. 2A, the wiper actuator includes an output shaft 176 that is configured to move linearly. The wiper 160 may include a plurality of gear teeth on and external surface configured to engage a rack positioned on the output shaft 176. Accordingly, linear movement of the output shaft 176 may be converted to rotational motion of the wiper 160 about the longitudinal axis. Such an arrangement allows for powered rotation of the wiper without central supports or the wiper and/or actuator that may obstruct the internal volume 113, as will be discussed further with reference to FIG. 3. While a linear wiper actuator 174 is shown in the embodiment of FIG. 2A, in other embodiments any suitable actuator may be employed, as the present disclosure is not so limited.

As shown in FIG. 2A and as will be discussed further with reference to FIG. 2B, the meal ingredient dispenser housing 112 includes lead-ins 118 to the portion volume 130. That is, as shown in FIG. 2A, the housing 112 includes lead-ins 118 that narrow a maximum transverse dimension (e.g., diameter) of the first housing portion 112A to a smaller traverse dimension (e.g., diameter) at an entrance to the portion volume 130. The maximum transverse dimension may be measured in a direction perpendicular to a direction of movement of a meal ingredient through the housing (e.g., perpendicular to the longitudinal axis L). For example, if the housing 112 is upright and the longitudinal axis L is parallel to a vertical direction, the maximum transverse dimension may be measured in a horizontal plane. The portion volume 130 may have a maximum transverse dimension greater than the maximum transverse dimension set by the lead-ins 118, so that a meal ingredient passing into the portion volume 130 past the lead-ins may have reduced contact with the internal wall of the portion volume compared to a housing where the maximum transverse dimension of the internal volume at an entrance to the portion volume and a maximum transverse dimension of the portion volume are the same. While lead-ins 118 are employed on the embodiment of FIG. 2A, in other embodiments a meal ingredient dispenser housing may include no lead-ins and the internal volume 113 may have a constant maximum transverse dimension to an entrance of the portion volume 130. In some embodiments, a meal ingredient dispenser may be configured such that a maximum transverse dimension of the internal volume of the meal ingredient dispenser does not decrease from the inlet 116 to the outlet 114. That is, the maximum transverse dimension at any location in the internal volume 113 may be greater than or equal to a maximum transverse dimension of the internal volume at the inlet 116. Such an arrangement may reduce stiction inside of the meal ingredient dispenser compared to a meal ingredient dispenser where a maximum transverse dimension of the internal volume decreases at a location between the inlet and outlet of the meal ingredient dispenser. Examples of a meal ingredient dispenser having a non-decreasing maximum transverse dimension will be discussed further with reference to the embodiments of FIGS. 10, 12, and 13. In other embodiments, the housing of a meal ingredient dispenser and a transition between the internal volume and the portion volume may have any suitable arrangement, as the present disclosure is not so limited.

Figure 2B:
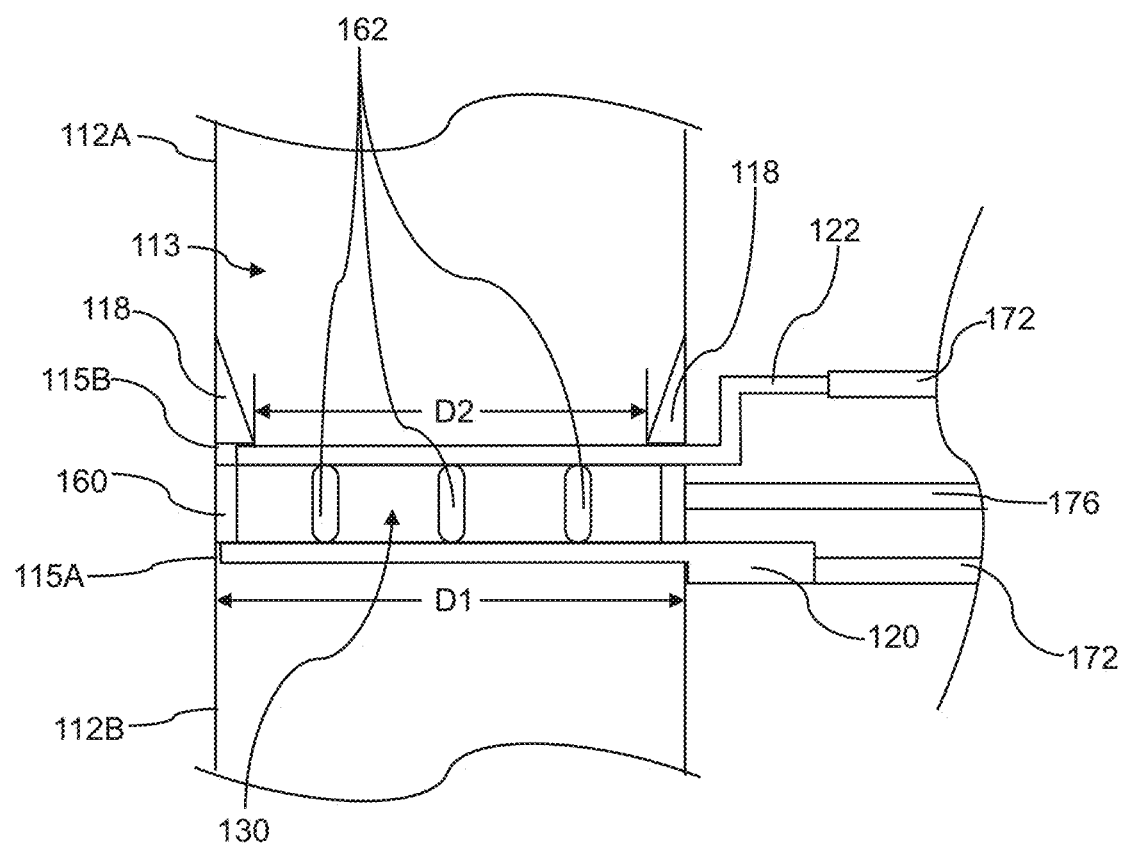
FIG. 2B is an enlarged side schematic of a wiper of the meal ingredient dispenser of FIG. 2A.

FIG. 2B is an enlarged side schematic of a wiper 160 of the meal ingredient dispenser of FIG. 2A. As more clearly shown in FIG. 2B, the first gate 120 is configured to move into a first slot 115A shown in the second housing portion 112B. Similarly, the second gate 122 is configured to move into a second slot 115B formed in the first housing portion 112A. Accordingly, the first gate and second gate are not physically coupled to the first housing portion or second housing portion, so that the gates may be moved out of the slot and the first housing portion 112A and second housing portion 112B may be removed from the meal ingredient dispenser for cleaning or other service.

As shown in FIG. 2B, the dimensions between the internal volume 113 and the portion volume 130 change to facilitate the movement of a meal ingredient toward the outlet of the meal ingredient dispenser. That is, as noted previously the first housing portion 112A includes lead-ins 118 configured to narrow a maximum transverse dimension of the internal volume 113 at an entrance to the portion volume 130. The lead-ins 118 are inclined relative to an internal wall of the first housing portion 112A such that a maximum transverse dimension (e.g., diameter) D2 of the internal volume 113 at an entrance of the portion volume is less than a maximum transverse dimension of the internal volume above the lead-ins. The maximum transverse dimension D2 is measured at a location of the internal volume abutting the second gate 122. At an exit of the portion volume 130 to the internal volume in the second housing portion 112B, the maximum transverse dimension of the internal volume (e.g., diameter) D1 is greater than the maximum transverse dimension D2. As discussed previously, such an arrangement may facilitate the movement of a meal ingredient portion from the portion volume 130 toward the outlet of the housing of the meal ingredient dispenser.

As discussed previously, in other embodiments the maximum transverse dimension at any location in the internal volume 113 may be greater than or equal to a maximum transverse dimension of the internal volume at the inlet of the meal ingredient dispenser. According to such an embodiment, the meal ingredient dispenser may not include any lead-ins 118. Rather, the first housing portion 112A may have a constant maximum transverse dimension D2 from the inlet to the portion volume 130. The second housing portion 112B may still have a larger maximum transverse dimension D1 such that the maximum transverse dimension increases from the inlet of the meal ingredient dispenser to the outlet of the meal ingredient dispenser. In this embodiment, the maximum transverse dimension of the internal volume does not decrease at any location between the inlet and outlet.

Figure 3:
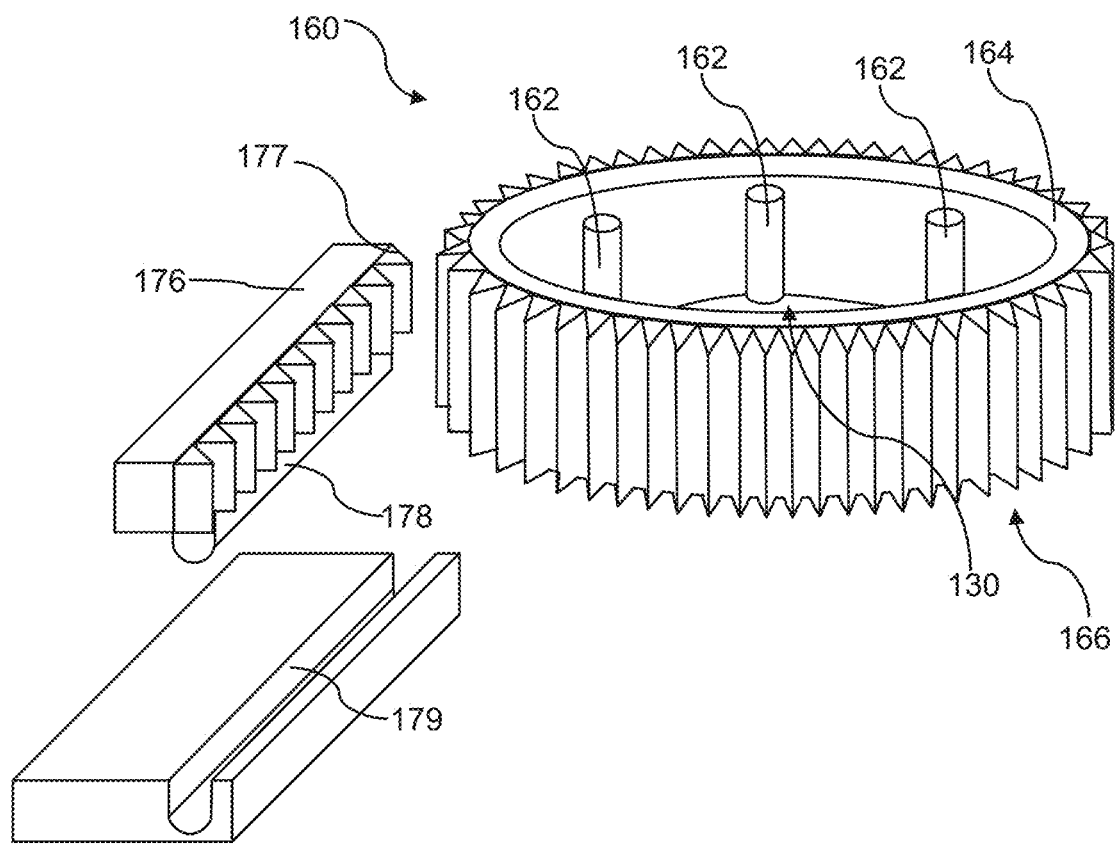
FIG. 3 is a perspective view of one embodiment of a wiper.

FIG. 3 is a perspective view of one embodiment of a wiper 160. As shown in FIG. 3, the wiper 160 is formed as an annulus 164. The wiper includes a plurality of wiper blades 162 distributed along a perimeter of an internal wall of the annulus. The internal wall of the annulus may define a maximum transverse dimension of a portion volume 130 configured to contain a meal ingredient portion. As the wiper 160 rotates, the wiper blades 162 may be configured to orbit a longitudinal axis of the portion volume 130 to dislodge any meal ingredient portions from the portion volume. As shown in FIG. 3, a central portion of the portion volume 130 is unobstructed by the wiper. That is, the annulus 164 does not include any central supports that obstruct a central portion of the portion volume 130. Accordingly, the wiper blades form an innermost portion of the wiper 160. As shown in FIG. 3, the wiper includes a plurality of gear teeth arranged on an exterior surface of the annulus. The gear teeth are configured to engage a wiper actuator output shaft 176 so that the wiper 160 may be rotated by the output shaft 176. In particular, a rack 177 of the output shaft 176 is configured to engage the gear teeth 166 disposed on the annulus 164. As shown in FIG. 3, the output shaft 176 may include a guide 178 which is configured to engage a guide channel 179. The guide channel may be fixed relative to a superstructure of a meal production system so that the guide channel supports the guide 178 and allowed the output shaft to move reliably in a linear direction. While a rack and pinion type of arrangement for the wiper is shown in FIG. 3, any suitable mechanical coupling may be employed to rotate the wiper 160, as the present disclosure is not so limited.

Figure 4:
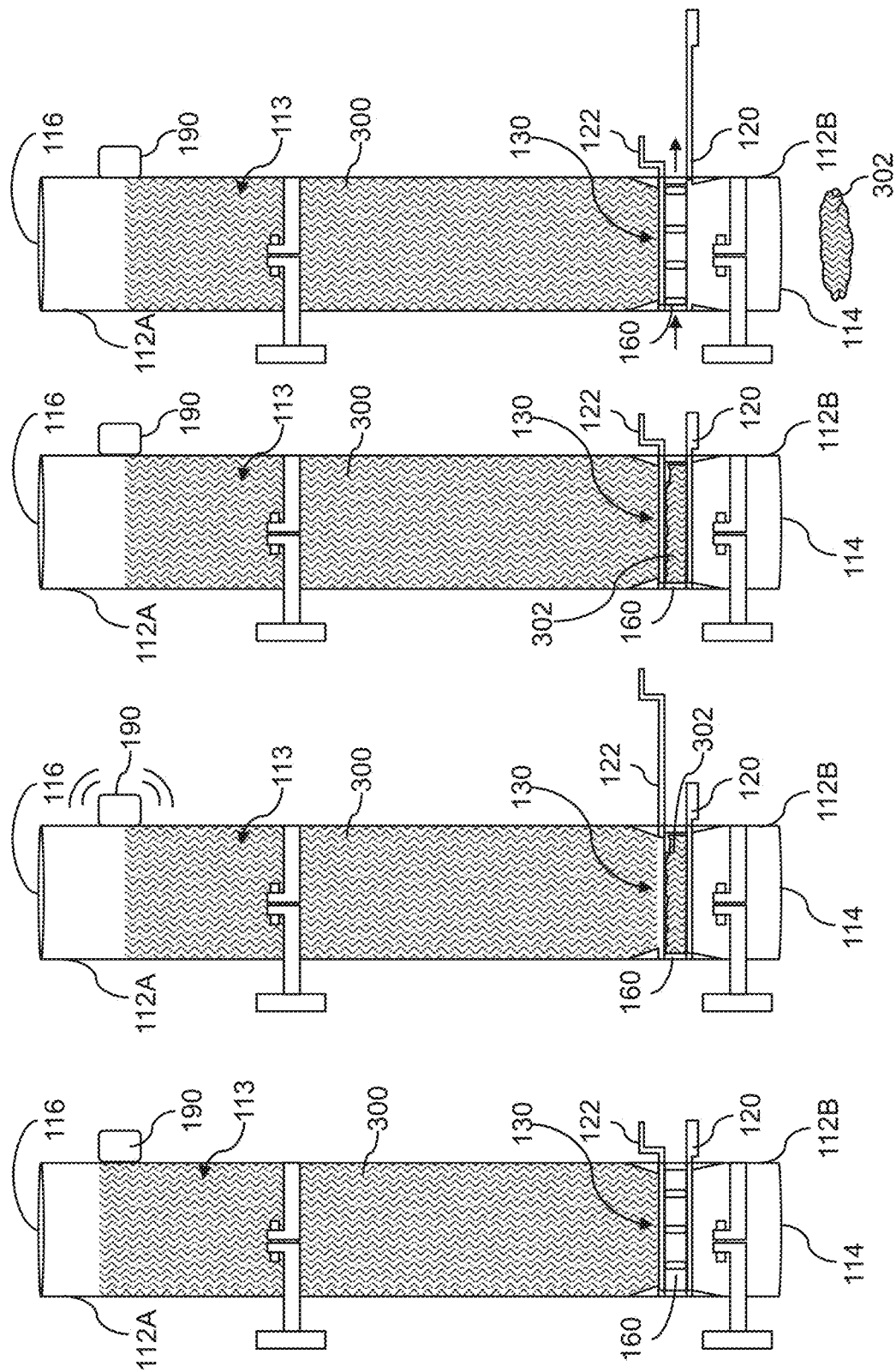
FIG. 4A is a side schematic of the meal ingredient dispenser of FIG. 2A in a first state.
FIG. 4B is a side schematic of the meal ingredient dispenser of FIG. 2A in a second state.
FIG. 4C is a side schematic of the meal ingredient dispenser of FIG. 2A in a third state.
FIG. 4D is a side schematic of the meal ingredient dispenser of FIG. 2A in a fourth state.

FIGS. 4A-4D depict the meal ingredient dispenser of FIG. 2A in various states of a meal ingredient portion dispensing process. FIG. 4A shows the meal ingredient dispenser in a first state. As shown in FIG. 4A, a meal ingredient 300 is positioned in the internal volume 113. The first gate 120 and the second gate 122 are in their respective closed positions. Accordingly, the second gate 122 blocks the meal ingredient portion from moving toward the outlet 114. As shown FIG. 4A, the portion volume 130 between the first gate and second gate is empty. Accordingly, the state shown in FIG. 4A may correspond to a state in which the internal volume 113 has been filled with the meal ingredient 300 but before any of the meal ingredient has been dispensed.

FIG. 4B is a side schematic of the meal ingredient dispenser of FIG. 2A in a second state. In the state of FIG.

4B, the second gate 122 has been moved from the closed position to the open position. In particular, the second gate has been moved out of the internal volume 113 so that the second gate no longer obstructs the internal volume. In some embodiments, the second gate is moved to the open position by a linear gate actuator. Accordingly, as shown in FIG. 4B, the meal ingredient 300 moves into the portion volume 130 to form a meal ingredient portion 302 of a predetermined volume. As shown in FIG. 4B, while the second gate 122 is in the open position the vibratory actuator 190 may be activated to vibrate the meal ingredient 300 to facilitate the movement of the meal ingredient into the portion volume 130.

FIG. 4C is a side schematic of the meal ingredient dispenser of FIG. 2A in a third state. As shown in FIG. 4C, the second gate has moved from the open position shown in FIG. 4B back to the closed position. The second gate 122 splits the meal ingredient 300 in the internal volume 113 from the meal ingredient portion 302. The meal ingredient portion 302 is separated from the meal ingredient above the second gate 122 so that the meal ingredient portion is ready to be dispensed from the outlet 114.

FIG. 4D is a side schematic of the meal ingredient dispenser of FIG. 2A in a fourth state. As shown in FIG. 4D, the first gate 120 has been moved from the closed position to the open position. Accordingly, the meal ingredient portion 302 that was in the portion volume 130 is free to drop through the outlet 114 onto a meal receptacle. The second gate 122 remains in the closed position, so that the meal ingredient 300 above the gate is blocked from moving into the portion volume 130. As shown by the arrows, the wiper 160 may rotate to dislodge the meal ingredient portion 302 from an internal walls of the meal ingredient dispenser to facilitate the meal ingredient falling out of the portion volume 130. In some embodiments, the wiper 160 may rotate at the same time the first gate 120 is moved from the closed position to the open position. According to this embodiment, the meal ingredient portion 302 may be dislodged at the same time the first gate is opened so that the meal ingredient portion falls out immediately on the first gate opening. In some embodiments, the first gate and wiper may be mechanically coupled so that the wiper 160 rotates whenever the first gate moves. In some other embodiments, the wiper may not rotate until the first gate 120 is already in the open position. Accordingly, a wiper 160 may move at any suitable time to dislodge a meal ingredient portion, as the present disclosure is not so limited.

Figure 5:
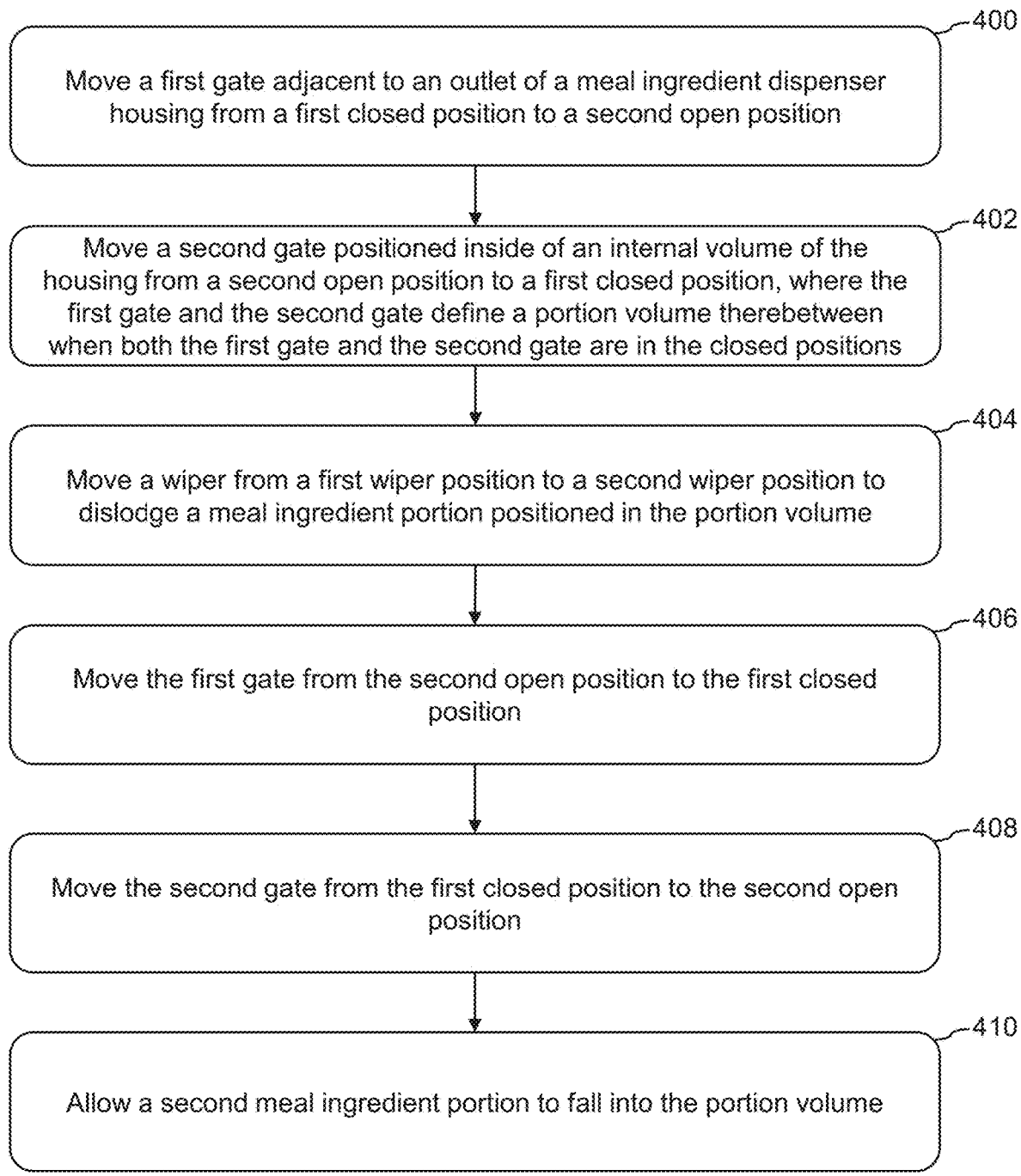
FIG. 5 is a flow chart for one embodiment of a method of operating a meal ingredient dispenser.

FIG. 5 is a flow chart for one embodiment of a method of operating a meal ingredient dispenser. In step 400, a first gate adjacent to an outlet of a meal ingredient dispenser housing is moved from a first closed position to a second open position. For example, in some embodiments the first gate may be moved between the closed position and the open position by a linear actuator. In step 402, a second gate positioned inside of an internal volume of the housing is moved from a second open position to a first closed position. In some embodiments, the second gate may be moved between the closed position and the open position by a linear actuator. In some embodiments, the steps of 400 and 402 may occur simultaneously. That is, the first gate may move to the open position at the same time that the second gate moves to the closed position. In some embodiments, the steps of 400 and 402 may be reversed. That is, the second gate may be moved to the closed position before the first gate is moved to the open position. The first gate and second gate may define a portion volume therebetween.

As shown in FIG. 5, in step 404 a wiper is moved from a first wiper position to a second wiper position to dislodge a meal ingredient portion position in the portion volume. In some embodiments, the first wiper position and second wiper positions may be rotational positions. In some embodiments, the wiper is configured to rotate about a longitudinal axis of the portion volume. In some embodiments, the wiper is configured to move linearly in a direction parallel to the longitudinal axis of the portion volume. Following step 404, a meal ingredient portion inside of the portion volume may be dispensed from an outlet of the meal ingredient dispenser. In step 406 the first gate is moved from the second open position to the first closed position. In step 408, the second gate is moved from the first closed position to the second open position. In step 410, a second meal ingredient portion falls into the portion volume. That is, the second meal ingredient portion falls past the second gate into the portion volume. Once the second meal ingredient portion is in the portion volume, the second gate may be moved to a closed portion to separate the second meal ingredient portion from a bulk volume of the meal ingredient in the meal ingredient dispenser.

Figure 6:
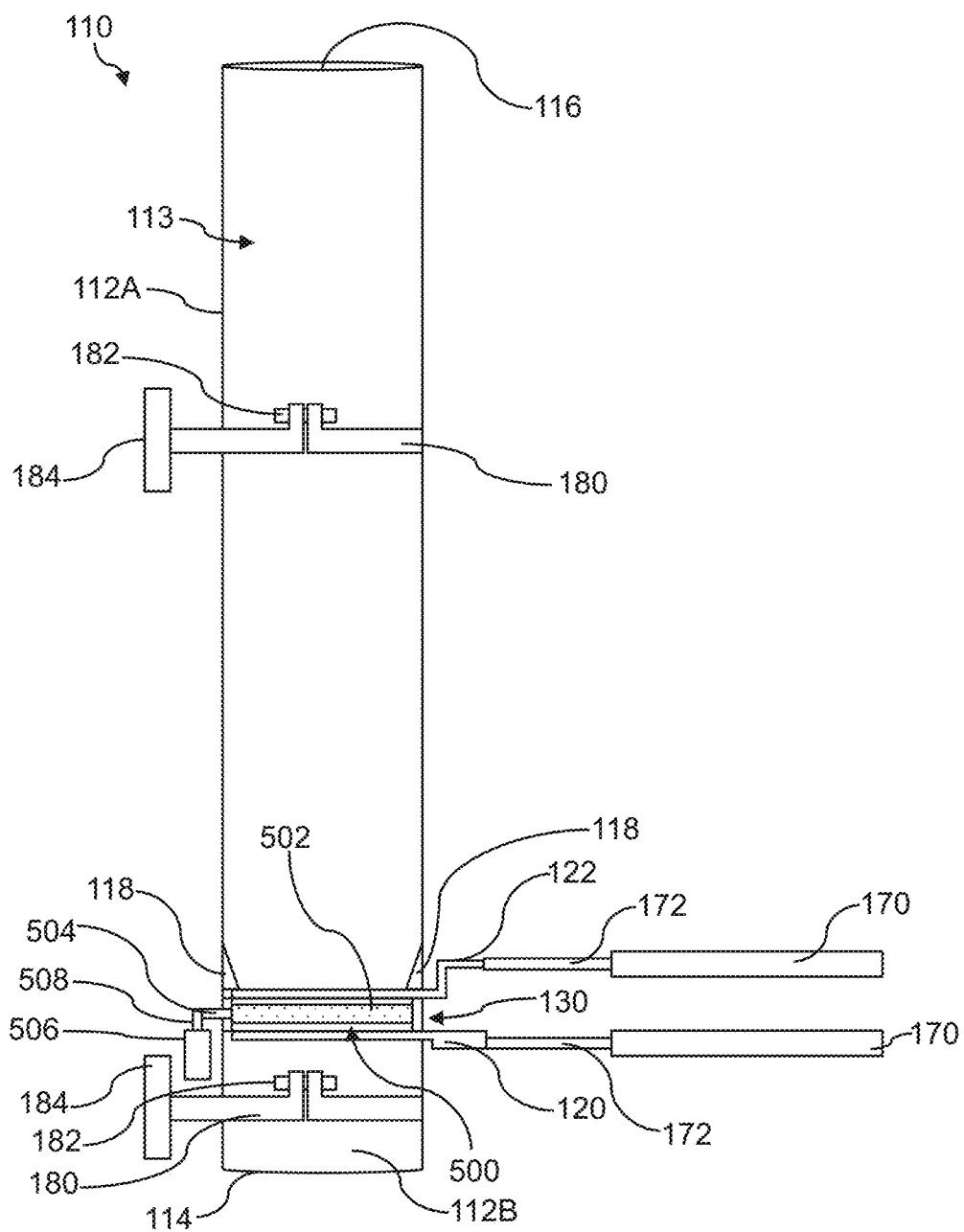
FIG. 6 is a side schematic of another embodiment of a meal ingredient dispenser.

FIG. 6 is a side schematic of another embodiment of a meal ingredient dispenser 110. As shown in FIG. 6, the meal ingredient dispenser is similar to that shown in FIG. 2A. The meal ingredient dispenser includes a housing with a first housing portion 112A and a second housing portion 112B. The housing includes an internal volume 113 configured to contain a meal ingredient. The meal ingredient dispenser also includes a first gate 120 and a second gate 122. The first gate and second gate may each be configured to move between an open position and closed position. The first gate and second gate are each coupled to a gate actuator 170 including a gate actuator output shaft 172. The gate actuators are configured to move the first gate and second gate linearly between the open and closed positions. The first gate and second gate define a portion volume 130

As shown in FIG. 6, the meal ingredient dispenser 110 of FIG. 6 includes a wiper 500 positioned in the portion volume 130 configured to dislodge a meal ingredient portion inside of the portion volume 130. According to the embodiment of FIG. 6, the wiper includes an annular wiper blade 502 that extends along a perimeter of an internal wall of the portion volume. The wiper blade 502 is coupled to a wiper arm 504 that extends out of the housing. The wiper arm is coupled to an output shaft 508 of a wiper actuator 506. As shown in FIG. 6, the wiper blade is configured to move in a direction parallel to a longitudinal axis of the internal volume 113 and portion volume 130. That is, the wiper moves linearly along an internal wall of the portion volume between multiple wiper positions. In the embodiment of FIG. 6, the wiper actuator 506 is a linear actuator that is oriented orthogonal to the gate actuators 170.

Figure 7A:
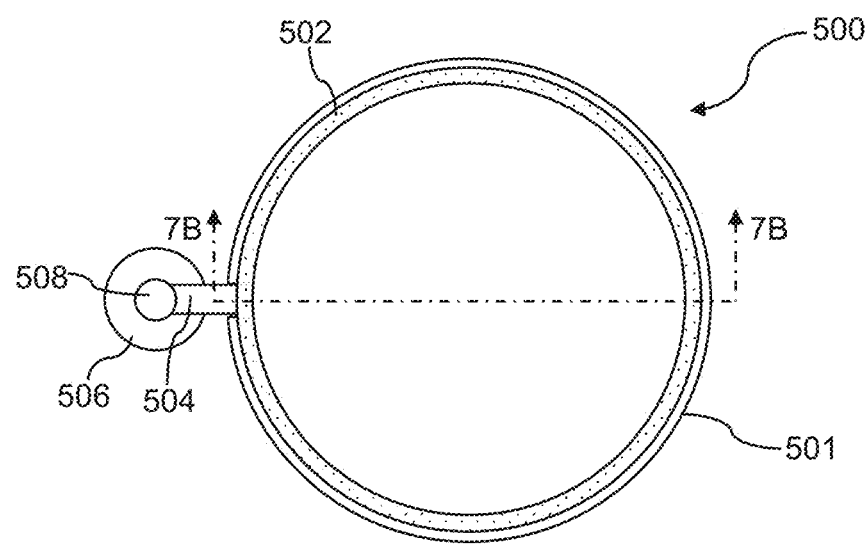
FIG. 7A is a top schematic of another embodiment of a wiper.

FIG. 7A is a top schematic of another embodiment of a wiper 500. The wiper 500 is similar to the wiper shown in FIG. 6. As shown in FIG. 7A, the wiper includes a wiper housing 501 that is formed as an annulus. According to the embodiment of FIG. 7A, the wiper housing may be coupled to one or more housing portions of a meal ingredient dispenser. The wiper also includes an annular wiper blade 502 that is in contact with an internal wall of the wiper housing 501. The wiper blade 502 is configured to move linearly along the internal wall to dislodge any meal ingredient portions in contact with the internal wall. As shown in FIG. 7A, the wiper blade 502 is coupled to a wiper arm 504, which in turn is coupled to an output shaft 508 of a wiper actuator 506. As shown in FIG. 7A, the arrangement of the wiper 500 is such that a central portion of the wiper housing is not obstructed by any portion of the wiper. That is, the wiper blade 502 forms the innermost portion of the wiper, such that a central passageway is open through the wiper. Accordingly, where a portion volume is at least partially contained within the wiper housing, a meal ingredient portion may pass freely through the wiper as the wiper does not obstruct the central portion of the portion volume.

Figure 7B:
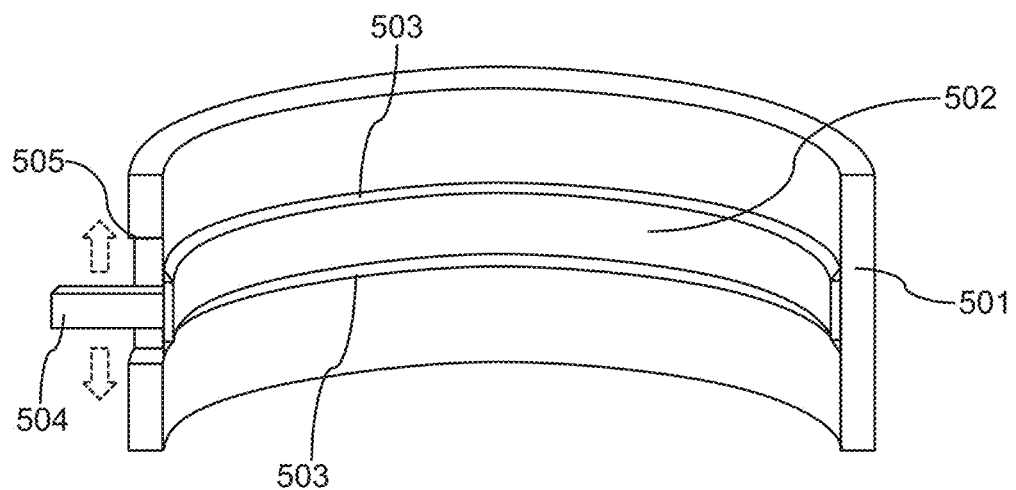
FIG. 7B is a side perspective cross sectional view of the wiper of FIG. 7A taken along line 7B-7B.

FIG. 7B is a side perspective cross sectional view of the wiper 500 of FIG. 7A taken along line 7B-7B. As shown in FIG. 7B, the wiper blade 502 is annular and positioned along an internal wall of the wiper housing 501. In the embodiment of FIG. 7B, the wiper blade includes tapered edges 503 forming both an upper leading edge and a lower leading edge of the wiper blade. The tapered edges of the wiper blade are inclined toward the internal wall of the wiper housing, so that the leading edges of the wiper blade are configured to engage and lift a meal ingredient portion away from the wall of the wiper housing 501. In other embodiments, a wiper blade may take any suitable configuration with tapered or non-tapered leading edges, as the present disclosure is not so limited. As shown in FIG. 7B, the wiper arm 504 extends through a slot 505 formed in the wiper housing. The slot 505 is configured so that the wiper arm 504 and blade 502 may move linearly (e.g., up and down) between wiper positions without interference from the wiper housing 501.

While the embodiment of FIGS. 7A-7B includes a wiper housing 501, in other embodiments the wiper may not include a wiper housing. In such an embodiment, the wiper arm 504 may extend through a slot formed in a housing of a meal ingredient dispenser. Correspondingly, the wiper blade 502 may be positioned on an internal wall of the housing. Accordingly, the present disclosure is not limited in this regard.

Figure 8:
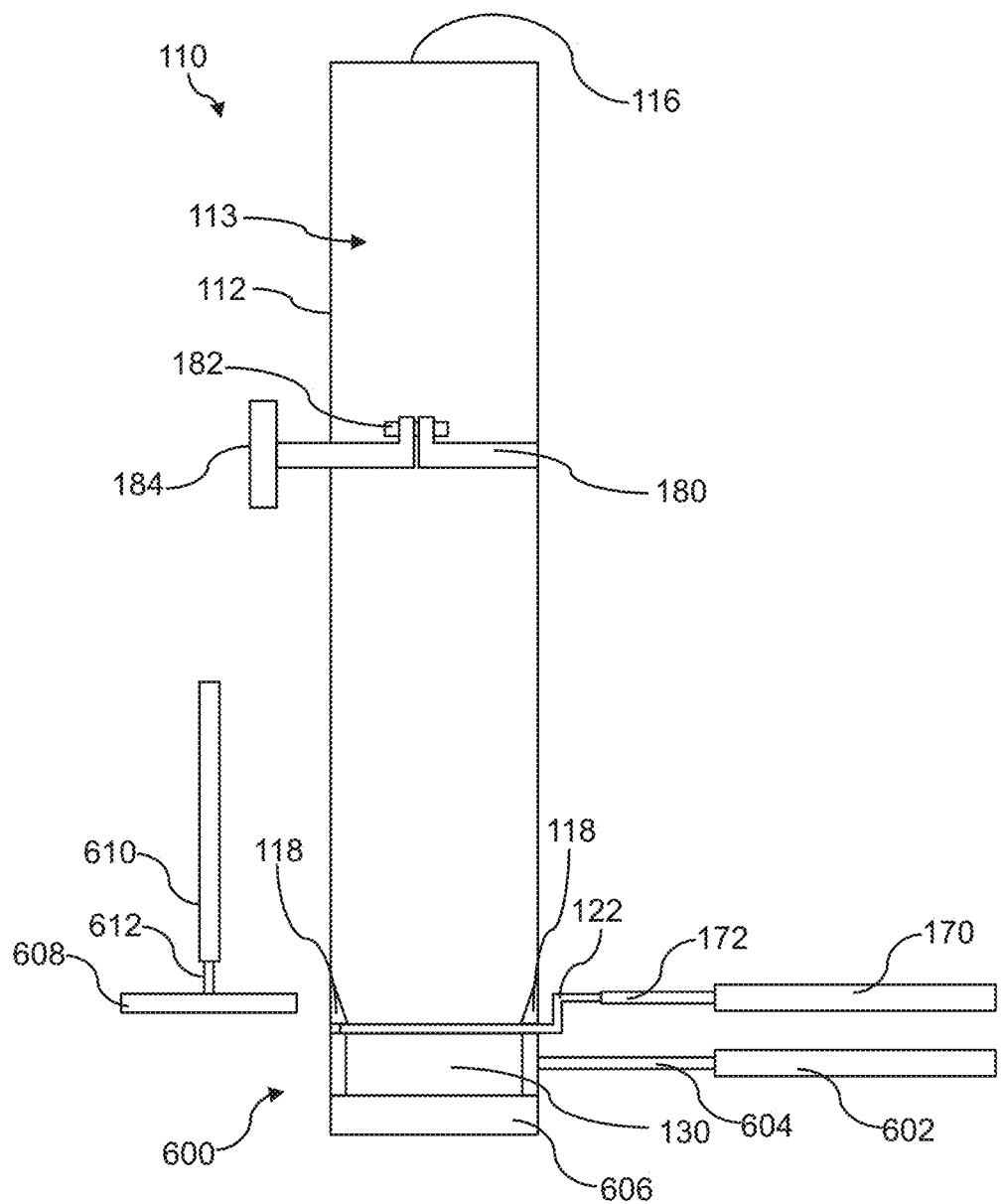
FIG. 8 is a side schematic of another embodiment of a meal ingredient dispenser.

FIG. 8 is a side schematic of another embodiment of a meal ingredient dispenser 110. The meal ingredient dispenser of FIG. 8 includes a housing 112 having an internal volume 113 configured to contain a meal ingredient like embodiments previously described. The housing includes an inlet 116 configured to receive a meal ingredient into the internal volume 113. The housing 112 is supported by a support 180 which is coupled to the housing with a quick release fastener 182. The support includes a flange 184 configured to allow the housing 112 to be attached to a superstructure of a meal production system. In other embodiments, any suitable arrangement for a support for the housing 112 may be employed, as the present disclosure is not so limited. As shown in FIG. 8, the housing includes lead-ins 118 that transition the internal volume 113 into a portion volume 130. According to the embodiment of FIG. 8, the portion volume is defined by a portion container 600, as will be discussed further below.

According to the embodiment of FIG. 8, the meal ingredient dispenser includes a gate 122 positioned at an entrance to the portion volume 130. The gate 122 is configured to move between a closed position as shown in FIG. 8 and an open position where the gate does not block the entrance to the portion volume. Put alternatively, the gate 122 selectively closes the internal volume 113 in the closed position and opens the internal volume in the open position. As shown in FIG. 8, the meal ingredient dispenser 110 includes a portion container 600 that is configured to move transversely between a receiving position and a dispensing position. According to the embodiment of FIG. 8, the portion container is formed as an annulus and accordingly the internal portion volume 130 is open at both an upper opening and a lower opening of the portion container. In some embodiments, the portion container may be formed as a cylindrical annulus. The upper opening of the portion container 600 is adjacent the gate 122 and the lower opening of the portion container is positioned against a floor 606. The floor 606 may be formed as a portion of housing 112 or a separate component that is configured to remain stationary relative to the portion container 600. In the receiving position shown in FIG. 8, the portion container is configured to receive a meal ingredient portion when the gate 122 moves to the open position. That is, the portion volume 130 is accessible to an outlet of the internal volume 113 when the gate 122 is in the open position. The meal ingredient dispenser 110 includes a portion container actuator 602 having an output shaft 604 configured to move the portion container between the receiving position and the dispensing position. In the dispensing position, the portion container may be moved away from the housing 112, so that a lower opening of the portion container is no longer adjacent the floor 606. Accordingly, the portion volume 130 may be open to allow a meal ingredient portion therein to fall from the portion container under the effect of gravity.

According to the embodiment of FIG. 8, the meal ingredient dispenser includes a wiper 608 that is positioned adjacent to and outside of the housing 112. The wiper is configured to move between a first proximal position and a second distal position relative to the portion container 600. In some embodiments as shown in FIG. 8, the proximal position may be vertically higher than the distal position. In some embodiments as shown in FIG. 8, the wiper 608 may be configured to move parallel to a longitudinal axis of the housing 112. In some embodiments, the wiper 608 may be configured to move transverse (e.g., perpendicular) relative to a direction of movement of the portion container 600. The wiper of FIG. 8 is coupled to a wiper actuator 610 having a wiper output shaft 612. The wiper actuator 610 is configured as a linear actuator configured to move the wiper between the proximal and distal position. When the portion container 600 is in the dispensing position, movement of the wiper 608 to the distal position may move the wiper through the portion volume 130, thereby pushing any meal ingredient portion contained therein out of the portion volume. Accordingly, in some embodiments, the wiper 608 may have a transverse shape that matches a transverse shape of the portion volume. For example, the wiper 608 may be formed as a cylinder having a diameter approximately equal to a diameter of a cylindrical portion volume 130. The functionality of the wiper will be discussed further with reference to FIGS. 9A-9C.

Figure 9:
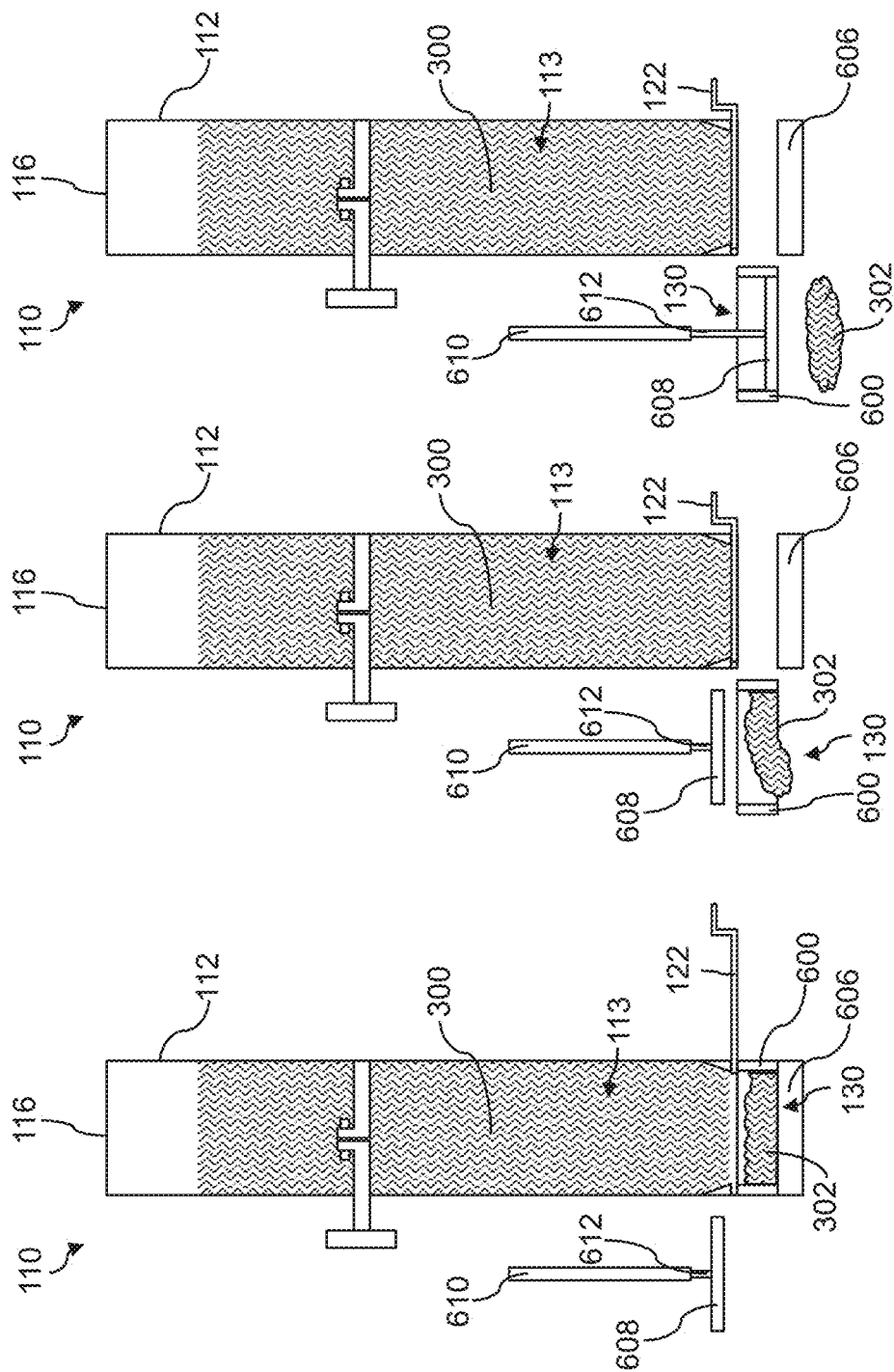
FIG. 9A is a side schematic of the meal ingredient dispenser of FIG. 8 in a first state.
FIG. 9B is a side schematic of the meal ingredient dispenser of FIG. 8 in a second state.
FIG. 9C is a side schematic of the meal ingredient dispenser of FIG. 8 in a third state.

FIG. 9A is a side schematic of the meal ingredient dispenser 110 of FIG. 8 in a first state. As shown in FIG. 9A, the gate 122 is in the open position. Accordingly, the gate 122 does not block an entrance to the portion volume 130 from the internal volume 113. Accordingly, a meal ingredient portion 302 is able to move into the portion volume from a bulk volume of meal ingredient 300 in the internal volume 113. As shown in FIG. 9A, the portion container 600 was in the receiving position to receive the meal ingredient portion. When the portion container 600 is in the receiving position, the floor 606 blocks the meal ingredient portion 302 from falling out of the portion volume 130. The wiper 608 is in the first proximal position, which does not interfere with the movement of the portion container 600 to the dispensing position as shown in FIG. 9B.

FIG. 9B is a side schematic of the meal ingredient dispenser of FIG. 8 in a second state. As shown in FIG. 9B, the portion container 600 has been moved to the dispensing position. That is, the portion container has been moved transversely to a longitudinal axis of the housing 112 of the meal ingredient dispenser away from the housing. According to the embodiment of FIG. 9B, the portion container may be moved by a portion container actuator. As shown in FIG. 9B, moving the portion container to the dispensing position moves the portion container out of alignment with the floor 606. Accordingly, the meal ingredient portion 302 is free to fall from the portion container 600. However, as shown in FIG. 9B, in some cases the meal ingredient portion may adhere to an internal wall of the portion container 600. As a result, the meal ingredient portion may resist falling from the portion container. Accordingly, as shown in FIG. 9C, the wiper 608 may be employed to force the meal ingredient portion out of the portion container 600. As shown in FIG. 9B, the gate 122 has been moved to a closed position which closes the internal volume 113 of the housing 112 and prevents the meal ingredient 300 contained therein from falling towards the floor 606. According to the embodiment of FIGS. 9A-9C, the gate 122 may be moved to the closed position whenever the portion container 600 is moved to the dispensing position.

FIG. 9C is a side schematic of the meal ingredient dispenser of FIG. 8 in a third state. As shown in FIG. 9C, the portion container 600 remains in the dispensing position. In the dispensing position the portion container may be aligned with the wiper 608. Accordingly, the wiper has moved from the proximal position to the distal position through the portion volume 130 to force the meal ingredient portion out of the portion volume 130. In particular, the wiper actuator 610 extends the wiper output shaft 612 to drive the wiper through the portion volume 130. The wiper 608 may completely fill a transverse surface area of the portion volume 130, so that the portion volume is fully cleared by the wiper 608. In some embodiments, the wiper 608 may fully pass through a volume of the portion container 600. Once the portion volume is cleared by the wiper 608, the wiper may be moved back to the proximal position. Once the wiper is back in the proximal position, the portion container 600 may be moved back to the receiving position to receive another meal ingredient portion.

Figure 10:
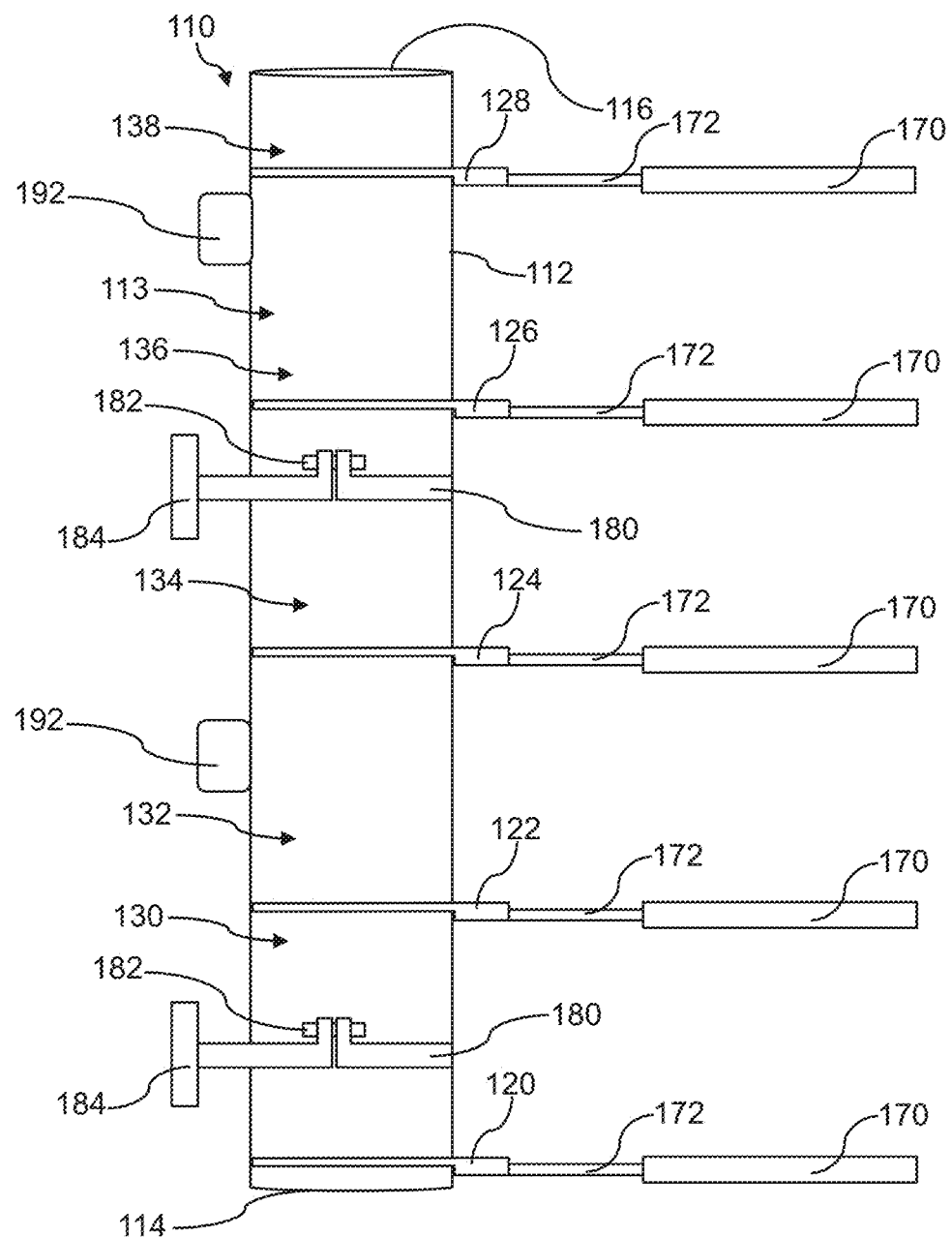
FIG. 10 is a side schematic of another embodiment of a meal ingredient dispenser.

FIG. 10 is a side schematic of another embodiment of a meal ingredient dispenser 110. According to the embodiment of FIG. 10, the meal ingredient dispenser may be associated with a cooking element. For example, the meal ingredient dispenser may be positioned at an outlet of a grill or other cooking element configured to heat meal ingredient portions. Accordingly, the meal ingredient portion may function as a buffer for heated meal ingredients that are heated by a separate cooking element. In other embodiments, the meal ingredient dispenser may be used with cold or room temperature meal ingredients, as the present disclosure is not so limited.

As shown in FIG. 10, the meal ingredient dispenser 110 includes a housing 112 that may be formed as a cylinder. Similar to previously described embodiments, the housing 112 includes an internal volume 113 configured to contain a meal ingredient. Like other embodiments described herein, the housing 112 is supported by multiple supports 180 that may be used to couple the housing to other portions of a meal production system. The meal ingredient dispenser also includes two heating elements 192. The heating elements 192 may be resistive heating elements configured to maintain the temperature of the internal volume 113 at a predetermined temperature. While two resistive heating elements are shown in FIG. 10, any suitable number of heating elements may be employed, as the present disclosure is not so limited.

In contrast to previously described embodiments, in the embodiment of FIG. 10 the internal volume 113 is divided into multiple portion volumes, each of which is configured to contain a single meal ingredient portion. The meal ingredient dispenser includes a first gate 120, a second gate 122, a third gate 124, a fourth gate 126, and a fifth gate 128. The first gate 120 is adjacent an outlet 114 of the housing 112, while the fifth gate 128 is adjacent an inlet 116 of the housing. Like previously described embodiments, the outlet is configured to dispense a meal ingredient portion to a meal receptacle. The inlet is configured to receive a meal ingredient portion from a cooking element or from another source. Each pair of gates of the meal ingredient dispenser defines a portion volume therebetween. The first gate 120 and second gate 122 define a first portion volume 130, the second gate 122 and the third gate 124 define a second portion volume 132, the third gate 124 and the fourth gate 126 define a third portion volume 134, and the fourth gate 126 and fifth gate 128 define a fourth portion volume 136. Additionally, according to the embodiment of FIG. 10, the fifth gate 128 and the inlet 116 define a fifth portion volume 138 of the meal ingredient dispenser. Each of the gates is configured to move between open and closed positions to selectively divide the internal volume 113 into the portion volumes noted previously. In the embodiment of FIG. 10, each gate is coupled to an output shaft 172 of a gate actuator 170 that is configured to move the gates between the open and closed positions. Accordingly, the configuration of FIG. 10 allows multiple meal ingredient portions to be kept separately in the portion volumes to be dispensed to a meal receptacle. As will be discussed further with reference to FIGS. 11A-11E, the gates may be moved between the open and closed positions to sequentially advance one or more meal ingredient portions toward the outlet 114 to eventually be dispensed to a meal receptacle.

FIG. 11A is a side schematic of the meal ingredient dispenser of FIG. 10 in a first state. As shown in FIG. 11A, a first meal ingredient portion 302 has been received through the inlet 116 into the fifth portion volume 138. The fifth gate 128 is in the closed position, and accordingly keeps the first meal ingredient portion inside of the fifth portion volume 138. As discussed previously, the first meal ingredient portion 302 may have been previously heated. Accordingly, the heating elements 192 may maintain the temperature of the internal volume 113, and in particular the fifth portion volume 138, at a predetermined temperature. For example, in some embodiments the heating elements may maintain a temperature between 135 and 200° F. In other embodiments, the first meal ingredient portion 302 may be cold or room temperature, and the heating elements 192 may be configured to heat the first meal ingredient portion to a predetermined temperature.

FIG. 11B is a side schematic of the meal ingredient dispenser of FIG. 10 in a second state. As shown in FIG. 11B, the fifth gate 128 has been moved from the closed position to the open position. Accordingly, the first meal ingredient portion 302 may fall by its own weight under the effect of gravity to the fourth portion volume 136. The fourth gate 126 that is in the closed position arrests the fall of the first meal ingredient portion 302 to keep the first meal ingredient portion in the fourth portion volume. The meal ingredient dispenser may be configured to arrest the fall of the meal ingredient portion in each of the portion volumes as the meal ingredient portion moves to the outlet 114. Such an arrangement may ensure the meal ingredient portion remains relatively cohesive so that smaller pieces of the meal ingredient portion, if they are present, are less likely to adhere to an internal wall of the housing 112. In other embodiments, multiple gates may be moved to the open position to allow a meal ingredient portion to fall past multiple portion volumes, as the present disclosure is not so limited.

FIG. 11C is a side schematic of the meal ingredient dispenser of FIG. 10 in a third state. As shown in FIG. 11C, the fourth gate 126 has been moved to the open position. Accordingly, the first meal ingredient portion 302 has fallen to the third portion volume 134. The first meal ingredient portion 302 is stopped in the third portion volume 134 by the third gate 124. As shown in FIG. 11C, the fifth gate 128 has been moved to the closed position relative to the state shown in FIG. 11B. Accordingly, the fifth portion volume 138 has received a second meal ingredient portion 304 through the inlet 116. As the fifth gate is closed, the first meal ingredient portion 302 is kept separate from the second meal ingredient portion 304.

FIG. 11D is a side schematic of the meal ingredient dispenser of FIG. 10 in a fourth state. As shown in FIG. 11D, the third gate has been moved to the open position, allowing the first meal ingredient portion to fall to the second portion volume 132. The second gate 122 remains in the closed position to keep the first meal ingredient portion in the second portion volume. As shown in FIG. 11D, the fifth gate 128 has also been moved to the open position. Accordingly, the second portion volume has fallen to the fourth portion volume 136. The fourth gate 126 has been moved back to the closed position from the state shown in FIG. 11C, so that the second meal ingredient portion is kept in the fourth portion volume. In this manner, multiple meal ingredient portions may be advanced toward the outlet 114 while being kept separate from one another. From the state shown in FIG. 11D, the meal ingredient portions may advanced further toward the outlet 114. Once a meal ingredient portion is in the first portion volume 130, the first gate 120 may be moved to an open position to dispense the meal ingredient portion in the first portion volume 130. As the meal ingredient dispenser includes five portion volumes, five meal ingredient portions may be stored in the meal ingredient dispenser while they are waiting to be dispensed. Each time a meal ingredient portion is dispensed from the outlet 114, the other meal ingredient portions may be sequentially advanced through the portion volumes toward the outlet 114 in a manner similar to that shown in FIGS. 11A-11D.

FIG. 11E is a side schematic of the meal ingredient dispenser of FIG. 10 in a fifth state. FIG. 11E depicts the meal ingredient dispenser in a state in which each of the portion volumes contains a meal ingredient portion. The first portion volume 130 contains the first meal ingredient portion 302, the second portion volume 132 contains the second meal ingredient portion 304, the third portion volume 134 contains a third meal ingredient portion 306, the fourth portion volume 136 contains a fourth meal ingredient portion 308, and the fifth portion volume 138 contains a fifth meal ingredient portion 310. While the meal ingredient dispenser of FIGS. 11A-11E includes five portion volumes, a meal ingredient dispenser may include any suitable number of portion volumes, as the present disclosure is not so limited.

According to the embodiment of FIGS. 11A-11E, the portion volumes are sized and shaped to receive a meal ingredient portion. More specifically, the portion volumes have a volume greater than a volume of the meal ingredient portion. Such an arrangement may facilitate movement of the meal ingredient portions, as the additional space provided by the portion volume may inhibit stiction of the meal ingredient portion to the internal walls of the housing 112 or the gates. In other embodiments, a portion volume may have any suitable volume, including a volume equal to the volume of a meal ingredient portion, as the present disclosure is not so limited.

Figure 12:
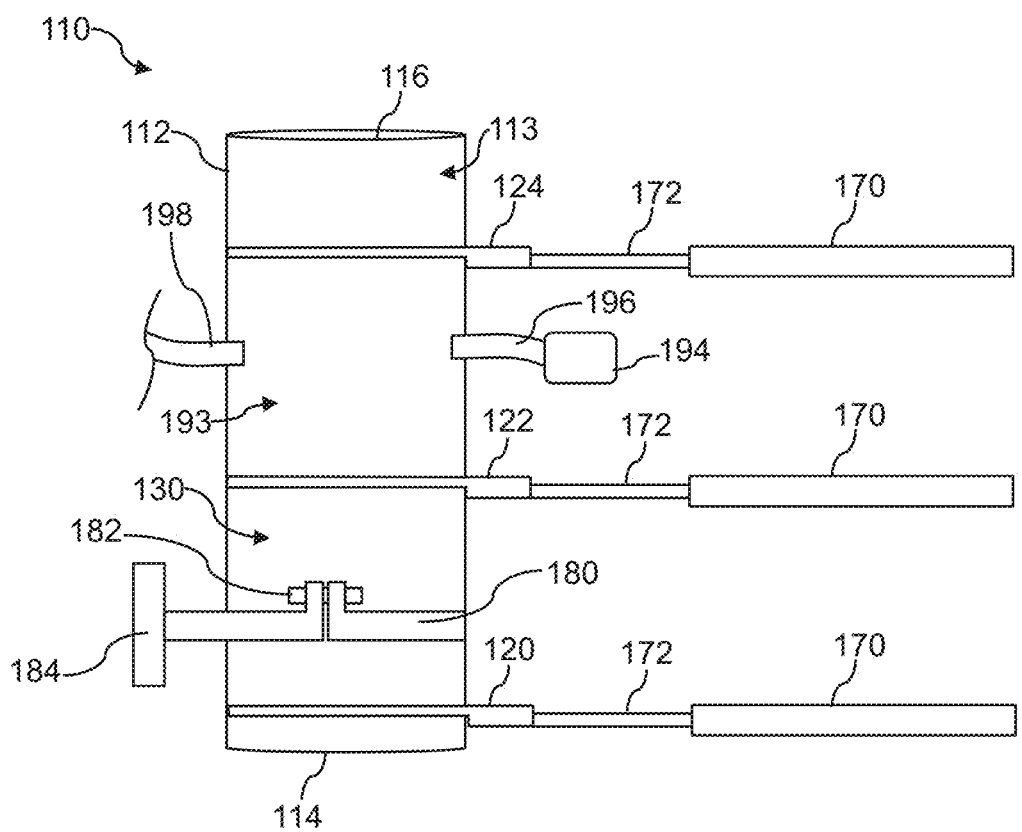
FIG. 12 is a side schematic of another embodiment of a meal ingredient dispenser including a cooking element.

FIG. 12 is a side schematic of another embodiment of a meal ingredient dispenser 110 including a cooking element. As shown in FIG. 12, the meal ingredient dispenser includes a housing 112 having an internal volume 113. The housing includes an inlet 116 configured to receive a meal ingredient (e.g., a meal ingredient portion), and an outlet 114 configured to dispenser a meal ingredient portion. As shown in FIG. 12, the meal ingredient dispenser includes a first gate 120, a second gate 122, and a third gate 124. Like previously described embodiments, the first gate, second gate, and third gate are each configured to move between a closed position and an open position. In in the embodiment of FIG. 12, each gate is coupled to an output shaft 172 of a gate actuator 170 which moves the gates between the open and closed positions. The gates are shown in the closed position in FIG. 12, where the gates divide the internal volume 113 into smaller volumes. In particular, as shown in FIG. 12 the first gate 120 and second gate 122 define a portion volume 130 therebetween configured to contain a meal ingredient portion. The second gate 122 and third gate 124 define a steaming volume 193 therebetween. According to the embodiment of FIG. 12, the cooking element is configured as a steam source 194 (e.g., a boiler) configured to generate steam. The cooking element is connected to the steaming volume 193 via a steam inlet 196. The steaming volume 193 is also connected to a steam outlet 198 so that steam from the steam source 194 may be circulated within the steaming volume. In other embodiments, once steam enters the steaming volume 193, the steam may be vented into the atmosphere or plumbed into a drain. For example, once a meal ingredient portion is heated in the steaming volume 193, the third gate 124 may be moved to an open position to vent the steam in the steaming volume through the inlet 116. As another example, the steam outlet 198 may be in fluid communication with the surrounding atmosphere, such that steam may vent to atmosphere through the steam outlet. In some such embodiments, the steam outlet 198 may be formed as a hole in the housing 112. In other embodiments, any suitable arrangement may be employed to allow steam to exit the steaming volume 193, as the present disclosure is not so limited.

According to the embodiment of FIG. 12, the steaming volume 193 may be configured to receive an unheated meal ingredient portion via the inlet 116. The third gate 124 may be moved to an open position to allow the meal ingredient portion to fall into the steaming volume. Once in the steaming volume, the third gate may move to the closed position so that the steaming volume 193 is fully enclosed. Once the steaming volume 193 is enclosed, the steam source 194 may supply steam to the steaming volume via the steam inlet 196. Accordingly, the unheated meal ingredient portion may be heated by the steam. Once the meal ingredient portion is sufficiently heated, the second gate 122 may move the open position to allow the heated meal ingredient portion (e.g., a cooked meal ingredient portion) to fall to the portion volume 130. In some embodiments, the portion volume 130 may be employed to temporarily store a heated meal ingredient portion prior to the arrival of a meal receptacle. In such an embodiment, residual heat from the steam source 194 may be employed to heat the portion volume 130 to a predetermined temperature. Accordingly, a heated meal ingredient portion may be kept warm as the heated meal ingredient portion remains in the portion volume. In this manner, the meal ingredient dispenser 110 of FIG. 12 may function as both a cooking element, and a buffer for the cooking element. While in the embodiment of FIG. 12 the meal ingredient dispenser includes a single steaming volume 193 and a single portion volume 130, a meal ingredient dispenser may include any suitable number of steaming volumes and portion volumes, as the present disclosure is not so limited. Additionally, while the cooking element of FIG. 12 is configured as a steam source 194, any suitable cooking element may be employed, as the present disclosure is not so limited. For example, in some embodiments the second gate 122 may be resistively heated to heat a meal ingredient portion through conduction.

While in the embodiment of FIG. 12 a steam source 194 is employed to provide steam to the steaming volume 193, in other embodiments a meal ingredient dispenser may include a cooking element configured as a hot air source. According to this embodiment, a hot air source may provide heated air to a heating volume in a manner similar to the way steam is provided to the steaming volume 193. Accordingly, the heating volume may function as an impingement oven, where a meal ingredient portion may be heated by the hot air supplied from a hot air source. In other embodiments any suitable cooking element may be employed, as the present disclosure is not so limited.

Figure 13:
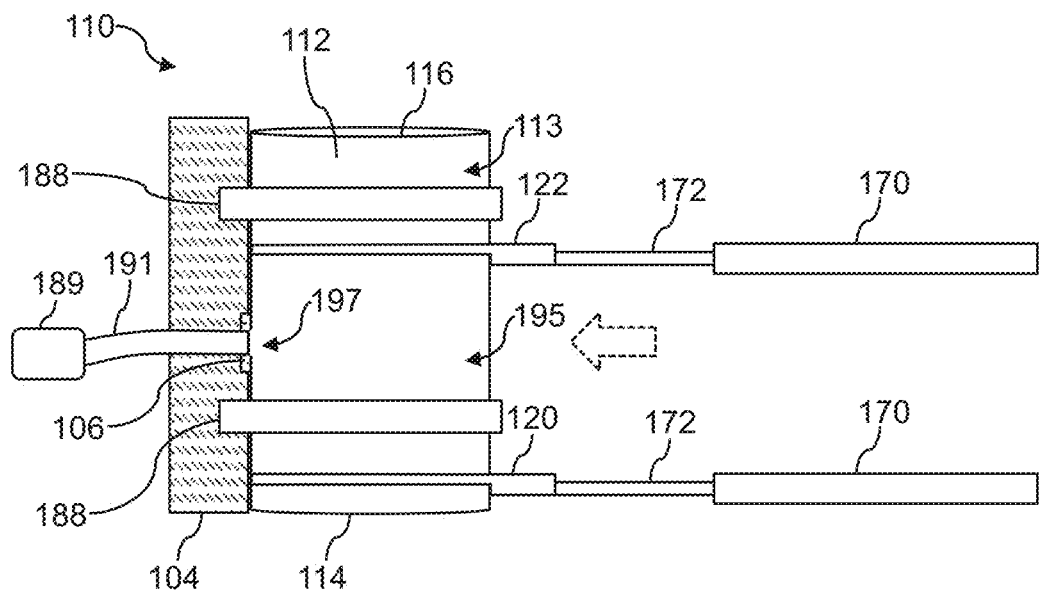
FIG. 13 is a side schematic of another embodiment of a meal ingredient dispenser.

FIG. 13 is a side schematic of another embodiment of a meal ingredient dispenser 110 including a cooking element configured to cook a meal ingredient portion. As shown in FIG. 13, the meal ingredient dispenser includes a housing 112 having an internal volume 113. The housing includes an inlet 116 configured to receive a meal ingredient (e.g., a meal ingredient portion), and an outlet 114 configured to dispenser a meal ingredient portion. As shown in FIG. 13, the meal ingredient dispenser includes a first gate 120 and a second gate 122. Like previously described embodiments, the first gate and second gate are each configured to move between a closed position and an open position. In the embodiment of FIG. 13, each gate is coupled to an output shaft 172 of a gate actuator 170 which moves the gates between the open and closed positions. The gates are shown in the closed position in FIG. 13, where the gates divide the internal volume 113 into smaller volumes. In particular, as shown in FIG. 13 the first gate 120 and second gate 122 define a heating portion volume 195 therebetween configured to contain a meal ingredient portion to be heated by the cooking element.

According to the embodiment of FIG. 13, the meal ingredient dispenser includes a hot air source 189 configured to supply hot air to the heating portion volume 195. The hot air source may include a heating element such as a resistive heating element, gas heating element, or any other suitable element configured to heat air to be delivered to the heating portion volume 195. As shown in FIG. 13, the hot air source 189 is connected to the heating portion volume via a hot air inlet 191. The hot air inlet 191 is in turn connected to the heating portion volume 195 via an opening 197 formed in a side of the housing 112. Accordingly, hot air from the hot air source 189 is able to flow through the hot air inlet into the heating portion volume 195 via the opening 197, where the hot air may be used to heat a meal ingredient portion. Once the meal ingredient portion is heated, the hot air may be vented to the atmosphere. For example, the first gate 122 may be moved to the open position and the hot air may exit the meal ingredient dispenser via the inlet 116. In other embodiments, any suitable arrangement for removing the hot air from the heating portion volume may be employed, as the present disclosure is not so limited. In some embodiments, the meal ingredient dispenser may include a hot air outlet, such that the hot air may flow continuously through the hot air volume 195. While in the embodiment of FIG. 13 the cooking element is a hot air source 189, in other embodiments the cooking element may be a steam source, as the present disclosure is not so limited.

As discussed previously, in some cases it may be desirable for a housing of a meal ingredient dispenser to be easily removable for regular cleaning or other services. According to the embodiment of FIG. 13, the housing 112 is easily removable from other components of the meal ingredient dispenser that may be fixed in place relative to a superstructure of a meal production system. As shown in FIG. 13, the hot air source 189 and hot air inlet 191 may be fixed in place relative to a superstructure supporting the meal ingredient dispenser. In particular, the hot air inlet 191 passes through a support 104 which is configured to removably support the housing 112. As shown in FIG. 13, the housing 112 is removably secured to the support 104 with two releasable clamps 188. The clamps are configured to apply force against the housing 112 in a direction towards the support 104 so that the housing 112 is pressed against the support, as shown by the dashed arrow. Accordingly, the opening 197 may be pressed against and/or aligned with the hot air inlet 191, such that hot air may reliably move from the hot air inlet into the heating portion volume 195. In some embodiments as shown in FIG. 13, the hot air inlet 191 may include a gasket 106 configured to make a fluidic seal between the opening 197 and the hot air inlet 191. The pressure applied by the clamps 188 may apply pressure to the gasket 106 to form the seal and inhibit hot air from escaping the junction between the housing 112 and the support 104. The gasket may be formed of rubber, silicone, or any other suitable material. In some embodiments, the gasket may be formed on the housing 112 instead of the hot air inlet 191, as the present disclosure is not so limited. The clamps 188 may be releasable (e.g., via a quick release fastener) to release the housing 112 from the support 104, allowing the housing to be removed without disconnecting any tubing associated with the hot air source 189. While two clamps are employed in the embodiment of FIG. 13, any number of clamps may be employed in other embodiments, as the present disclosure is not so limited.

Figure 14:
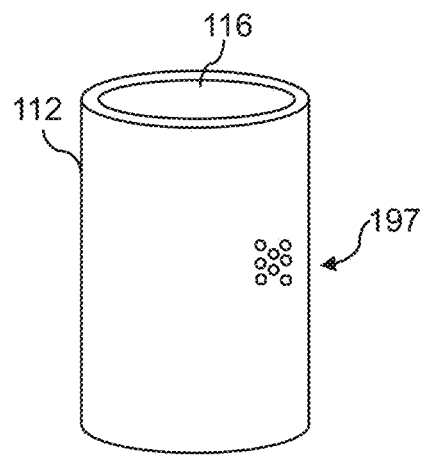
FIG. 14 is a perspective schematic of an embodiment of a meal ingredient dispenser housing.

FIG. 14 is a perspective schematic of an embodiment of a meal ingredient dispenser housing 112. According to the embodiment of FIG. 14, the housing 112 is configured to be employed with a cooking element (for example, see FIG. 13). As shown in FIG. 14, the housing 112 includes an inlet 116 configured to receive a meal ingredient portion. The housing 112 also includes an opening 197 formed as a plurality of holes in a side of the housing. The opening 197 may be aligned with a steam inlet or hot air inlet when the housing is installed on a superstructure of a meal production system. Accordingly, hot air or steam may pass through the opening 197 into a steaming or heating volume inside of the housing 112. The housing 112 and opening 197 may not be physically attached to a hot air or steam inlet, such that the housing 112 may be removed from the hot air or steam inlet without disconnecting any tubing.

Figure 15:
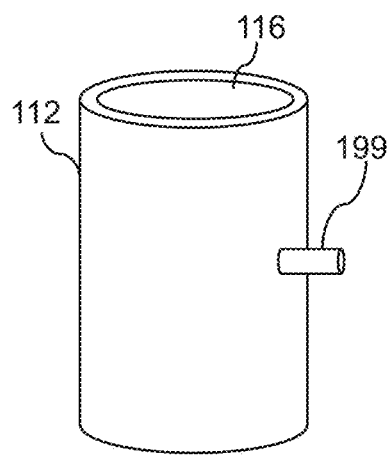
FIG. 15 is a perspective schematic of another embodiment of a meal ingredient dispenser housing.

FIG. 15 is a perspective schematic of another embodiment of a meal ingredient dispenser housing 112. According to the embodiment of FIG. 15, the housing 112 is configured to be employed with a cooking element (for example, see FIG. 13). As shown in FIG. 15, the housing 112 includes an inlet 116 configured to receive a meal ingredient portion. The housing 112 also includes a hose inlet attachment 199. The hose inlet attachment may be coupled to a hot air inlet or steam inlet via a press fit or a suitable fastener (e.g., releasable hose clamp). Accordingly, the hose inlet attachment may allow hot air or steam from a hot air source or steam source, respectively, to flow into a volume of the housing 112 to heat a meal ingredient portion. The hose inlet attachment may be removed from the hot air or steam inlet, such that the housing 112 may be removable from other components of a meal ingredient dispenser. In some embodiments, the hose inlet attachment may be received inside of a stationary hot air or steam inlet. For example, the hose attachment may be received inside of a hot air inlet or steam inlet disposed in a support (for example, see FIG. 13). According to this embodiment, the hose inlet attachment 199 may be removably coupled to the hot air or steam inlet, such that physical movement of the housing 112 is all that is needed to remove the hose inlet attachment from the hot air or steam inlet.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the embodiments described herein may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present disclosure as discussed above. As used herein, the term "computer-readable storage medium" encompasses only a non-transitory computer-readable medium that can be considered to be a manufacture (i.e., article of manufacture) or a machine. Alternatively or additionally, the disclosure may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present disclosure as discussed above. Additionally, it should be appreciated that according to one aspect of this embodiment, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

A machine controller including one or more processors may communicate with one or more actuators using any suitable communication protocol. For example, a machine controller may communicate with one or more actuators and/or sensors via serial, I2C, SPI, CAN, and/or any other appropriate protocol. A machine controller may receive one or more inputs from one or more users. In some cases, the one or more inputs may be associated with pre-stored computer readable instructions stored on non-volatile memory. Accordingly, the one or more inputs may instruct the machine controller to execute one or more sets of computer readable instructions associated with the inputs. The machine controller may communicate with and control one or more actuators to execute the computer readable instructions.

Various aspects of the present disclosure may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the embodiments described herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. A meal ingredient dispenser for a meal production system, comprising:
   a housing including an internal volume configured to contain at least one portion of a meal ingredient, the housing including an outlet through which the meal ingredient is dispensed, and the housing having an axis aligned with a direction in which the meal ingredient is dispensed;
   a first gate positioned adjacent the outlet, wherein the first gate is configured to move between a first open position and a second closed position;
   a second gate positioned in the internal volume, wherein the second gate is configured to move between a first open position and a second closed position, and wherein the first gate and the second gate define a portion volume therebetween when both the first gate and the second gate are in the closed positions;
   a wiper positioned on at least a portion of an interior wall of the housing in the portion volume; and
   an actuator coupled to the wiper and configured to move the wiper inside of the portion volume.

2. The meal ingredient dispenser of claim 1, wherein the wiper is configured to move between a first wiper position and a second wiper position.

3. The meal ingredient dispenser of claim 2, wherein the first wiper position is a first rotational position and the second wiper position is a second rotational position, and wherein the wiper is configured to rotate about the axis.

4. The meal ingredient dispenser of claim 3, wherein the wiper is formed as a pinion, and the actuator includes a rack engaged with the pinion.

5. The meal ingredient dispenser of claim 4, wherein at least one of the first gate and the second gate is coupled to the actuator, such that when the wiper moves between the first wiper position and the second wiper position at least one the first gate and the second gate moves between the first open position and the second closed position.

6. The meal ingredient dispenser of claim 2, wherein the first wiper position is a distal position and the second wiper position is a proximal position, and wherein the wiper is configured to move parallel to the axis between the first wiper position and second wiper position.

7. The meal ingredient dispenser of claim 6, wherein the wiper does not obstruct a central portion of the internal volume.

8. The meal ingredient dispenser of claim 1, wherein the wiper is configured to move continuously in a single direction along the internal wall.

9. The meal ingredient dispenser of claim 1, wherein the wiper is configured to move along the entirety of the interior wall of the housing in the portion volume to dislodge any portions of the meal ingredient contained within the portion volume.

10. The meal ingredient dispenser of claim 1, wherein the wiper is configured to move linearly along the interior wall in a direction parallel to the axis of the housing.

11. The meal ingredient dispenser of claim 1, wherein the wiper is one of a plurality of wiper blades, and wherein the plurality of wiper blades are configured to move inside of the portion volume.

12. The meal ingredient dispenser of claim 1, wherein the actuator is a linear actuator.

13. A meal ingredient dispenser for a meal production system, comprising:
   a housing including an internal volume configured to contain at least one portion of a meal ingredient, the housing including an outlet through which the meal ingredient may pass out of the internal volume;
   a portion container configured to receive a portion of the meal ingredient in a portion volume, wherein the portion container includes an upper opening and a lower opening, wherein the portion container is configured to move between a receiving position in which the upper opening is accessible to the outlet and a dispensing position in which the lower opening is open to dispense the portion, wherein the portion container moves transverse to an axis of the housing between the receiving position and the dispensing position;
   a wiper positioned adjacent to and outside of the housing, wherein the wiper is configured to move between a first proximal position and a second distal position, wherein in the distal position a portion of the wiper extends into the portion volume through the upper opening; and an actuator coupled to the wiper and configured to move the wiper between the first proximal position and the second distal position.

14. The meal ingredient dispenser of claim 13, further comprising a floor positioned opposite the outlet, wherein in the receiving position the portion container is positioned between the outlet and the floor such that the floor closes the lower opening.

15. The meal ingredient dispenser of claim 13, wherein the wiper is configured to move linearly between the first proximal position and the second distal position.

16. The meal ingredient dispenser of claim 13, wherein the actuator is a linear actuator.

17. The meal ingredient dispenser of claim 13, further comprising a first gate adjacent the outlet, wherein the first gate is configured to move between a first open position and a second closed position.

18. A meal ingredient dispenser for a meal production system, comprising:
- a removable housing including an internal volume, an inlet, and an outlet, wherein the inlet is configured to receive meal ingredient portions into the internal volume;
- a first gate adjacent the outlet, wherein the first gate is configured to move between a first open position and a second closed position;
- a second gate positioned in the internal volume, wherein the second gate is configured to move between a first open position and a second closed position, wherein the first gate and the second gate define a first portion volume therebetween when both the first gate and the second gate are in the closed positions, and wherein the first portion volume is configured to contain a meal ingredient portion;
- a third gate positioned in the internal volume and configured to move between a first open position and a second closed position, wherein the second gate and the third gate define a second portion volume therebetween when the second gate and the third gate are in the closed positions;
- a fourth gate in the internal volume and configured to move between a first open position and a second closed position, wherein the third gate and fourth gate define a third portion volume therebetween when both the third gate and fourth gate are in the closed positions; and
- a heating element configured to heat the first portion volume.

19. The meal ingredient dispenser of claim 18, wherein the heating element is configured to heat the third portion volume, and wherein residual heat from the third portion volume heats the first portion volume and the second portion volume.

20. The meal ingredient dispenser of claim 18, further comprising a vibratory actuator configured to vibrate the housing.

21. The meal ingredient dispenser of claim 18, further comprising:
- a wiper positioned on an interior wall of the housing in the first portion volume; and
- an actuator coupled to the wiper and configured to move the wiper inside of the first portion volume.

22. The meal ingredient dispenser of claim 18, wherein the heating element is configured to maintain the internal volume of the housing at a temperature between 135 and 200° F.

23. The meal ingredient dispenser of claim 18, wherein the first gate and the second gate are configured to move transversely to a longitudinal axis of the housing.

* * * * *